Figure 7:
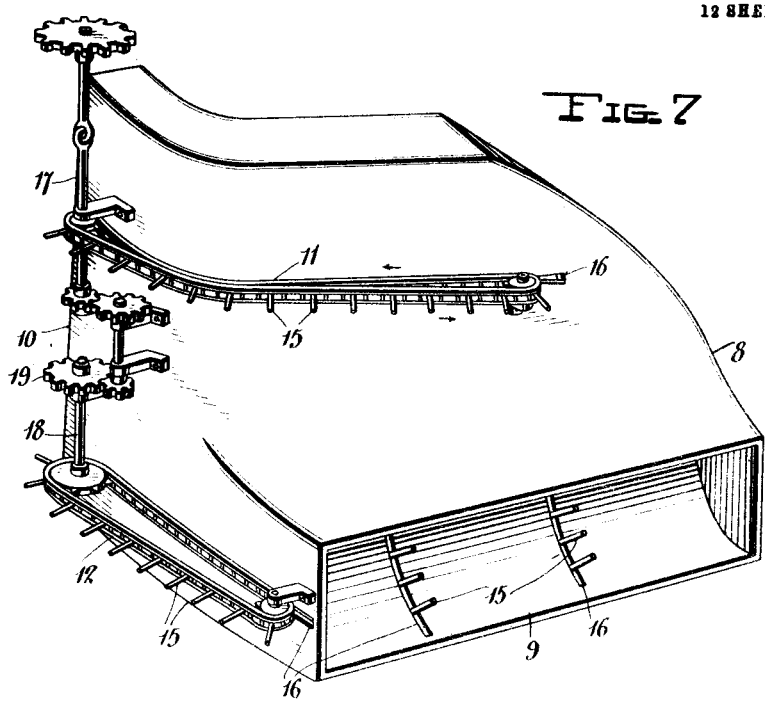

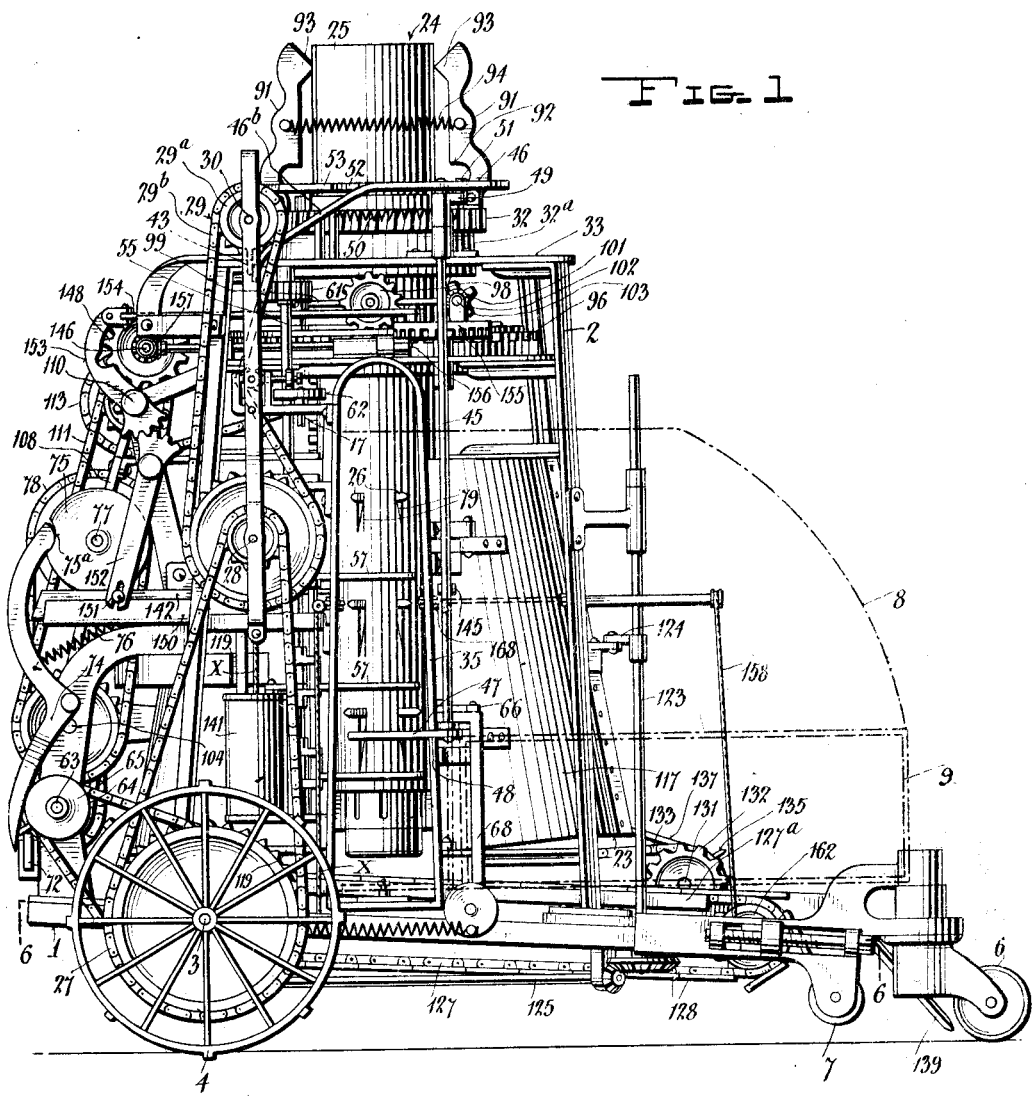

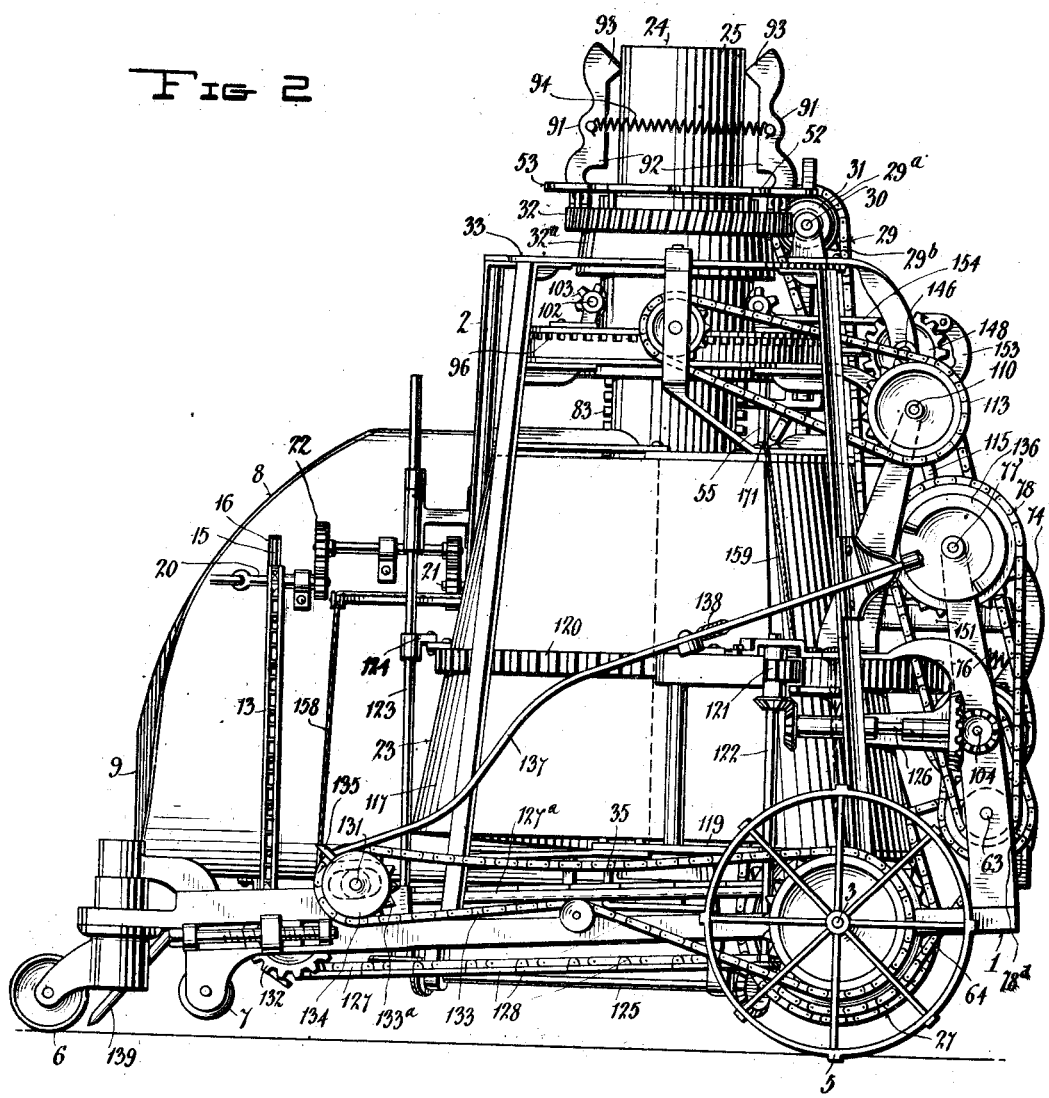

P. KETELSEN.
SHOCK FORMING MACHINE.
APPLICATION FILED DEC. 31, 1912.
1,088,592. Patented Feb. 24, 1914.
12 SHEETS—SHEET 3.
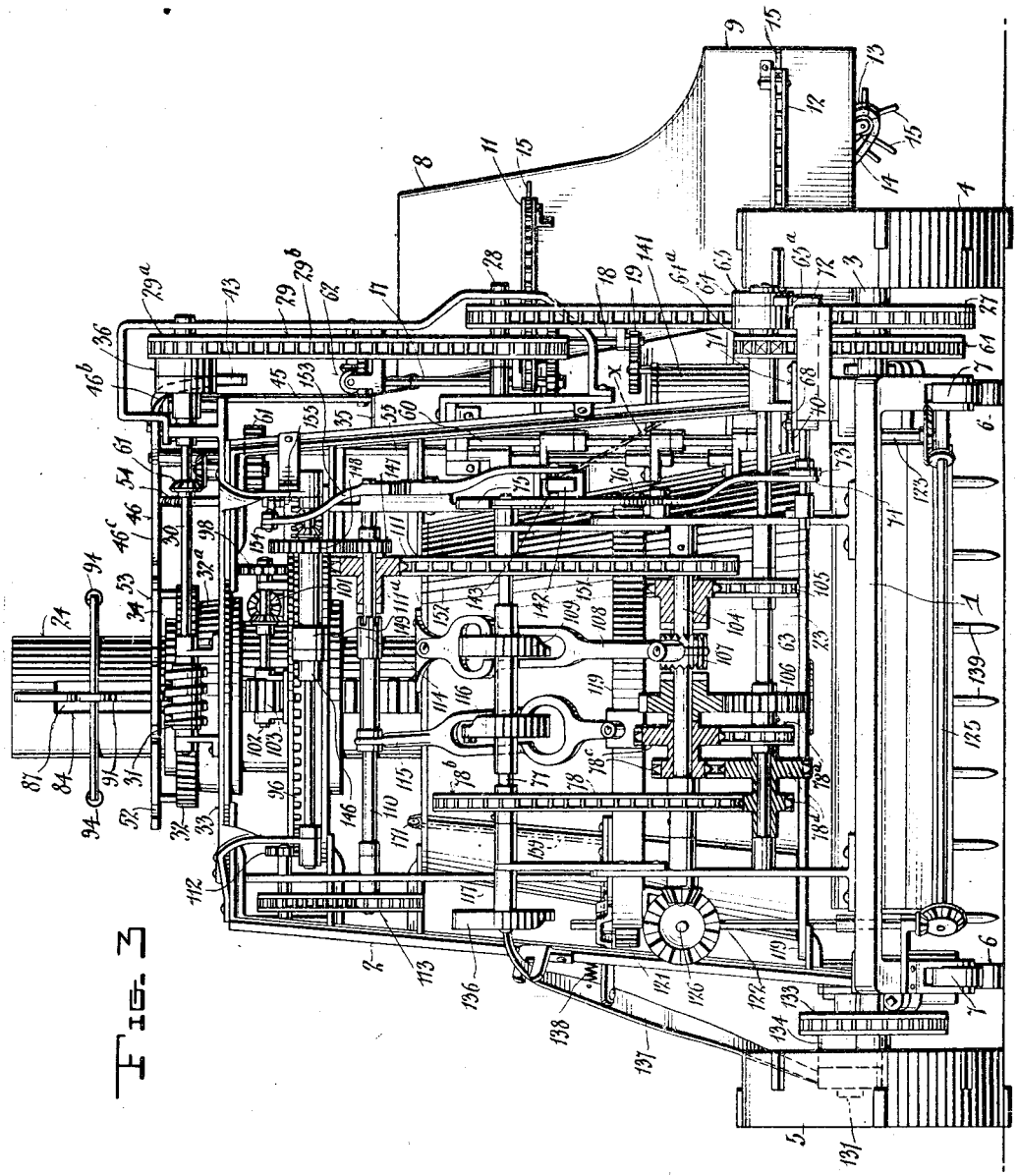
Witnesses
Inventor
Peter Ketelsen
by
Attorney.

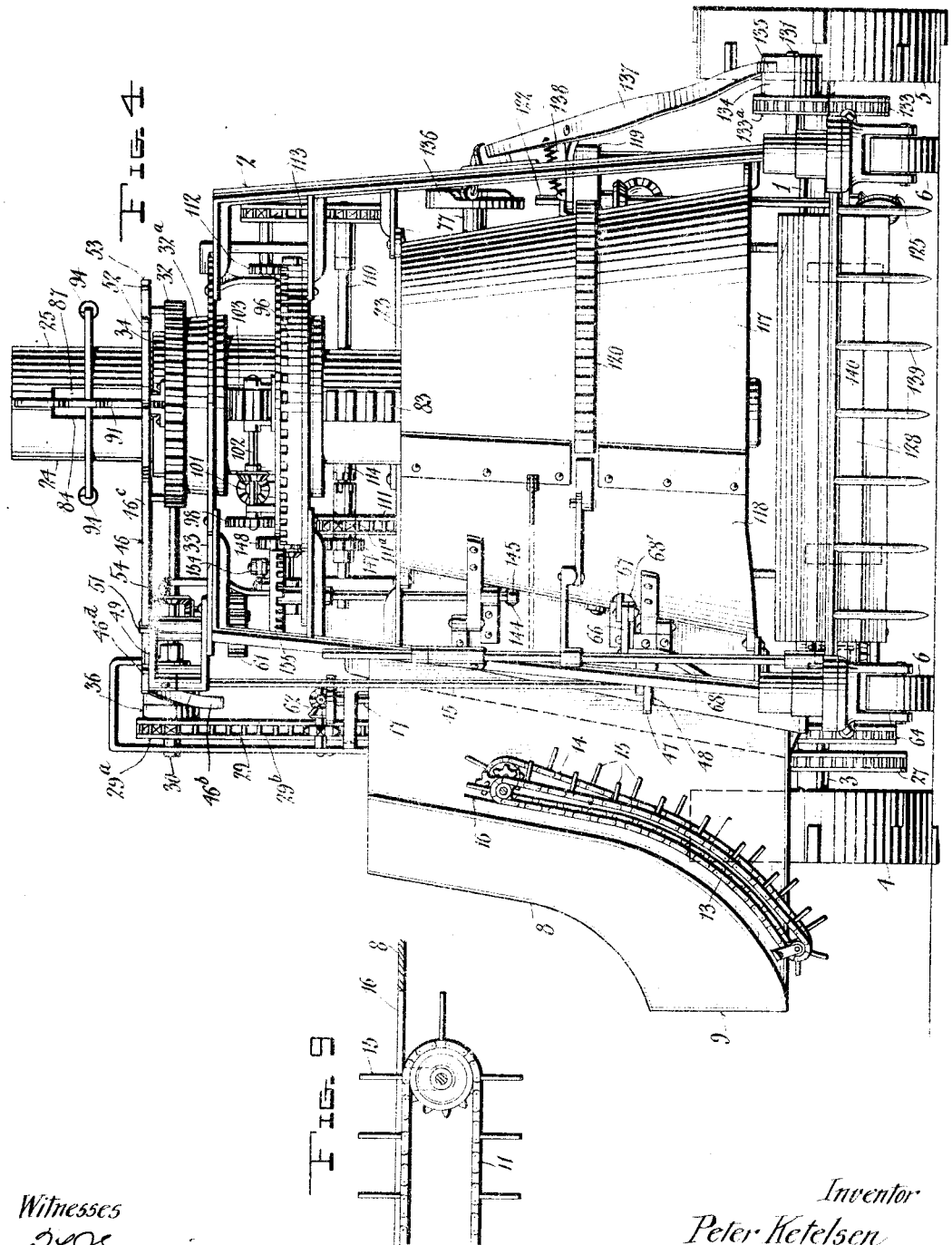

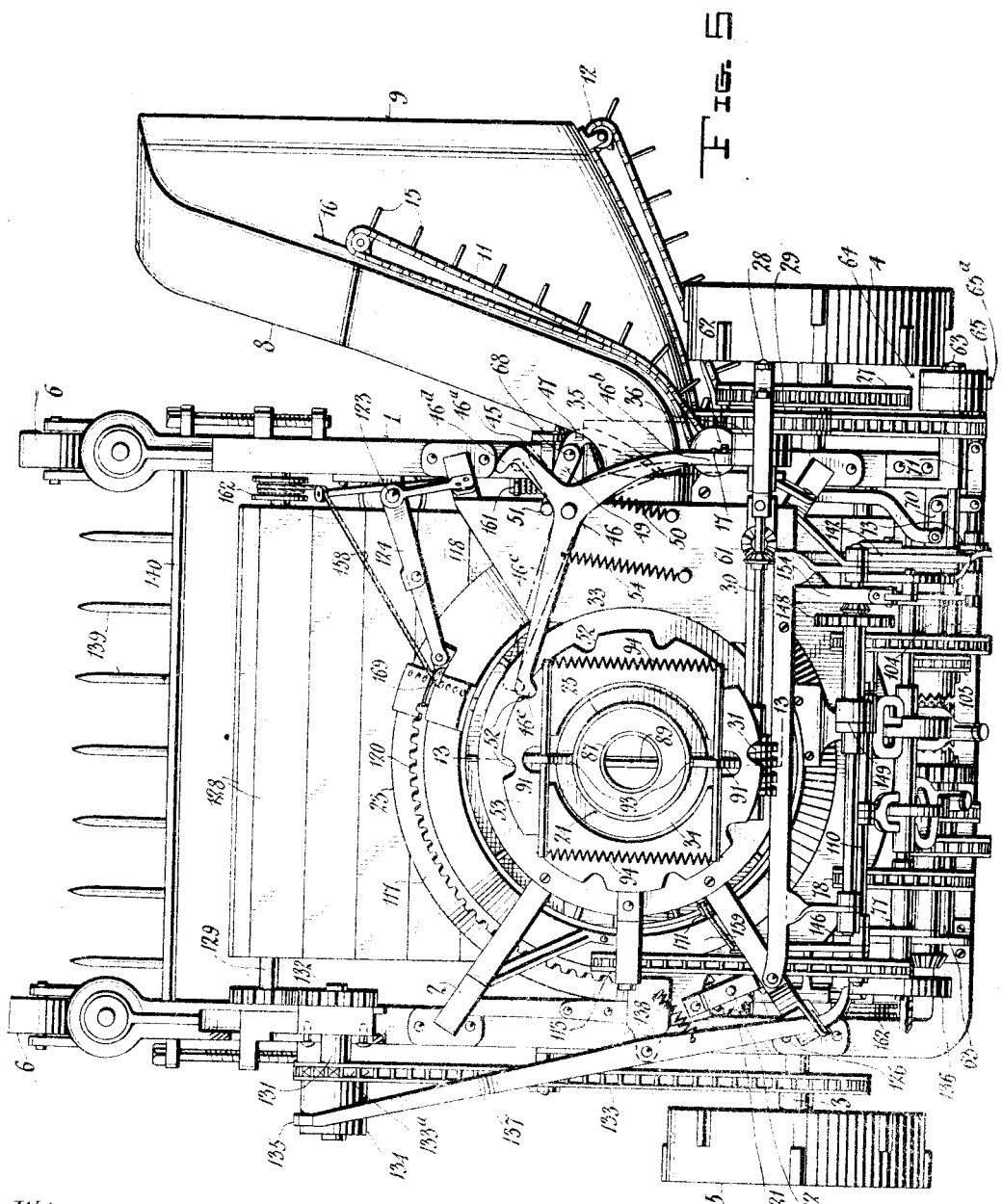

P. KETELSEN.
SHOCK FORMING MACHINE.
APPLICATION FILED DEC. 31, 1912.
1,088,592.
Patented Feb. 24, 1914.
12 SHEETS—SHEET 6.
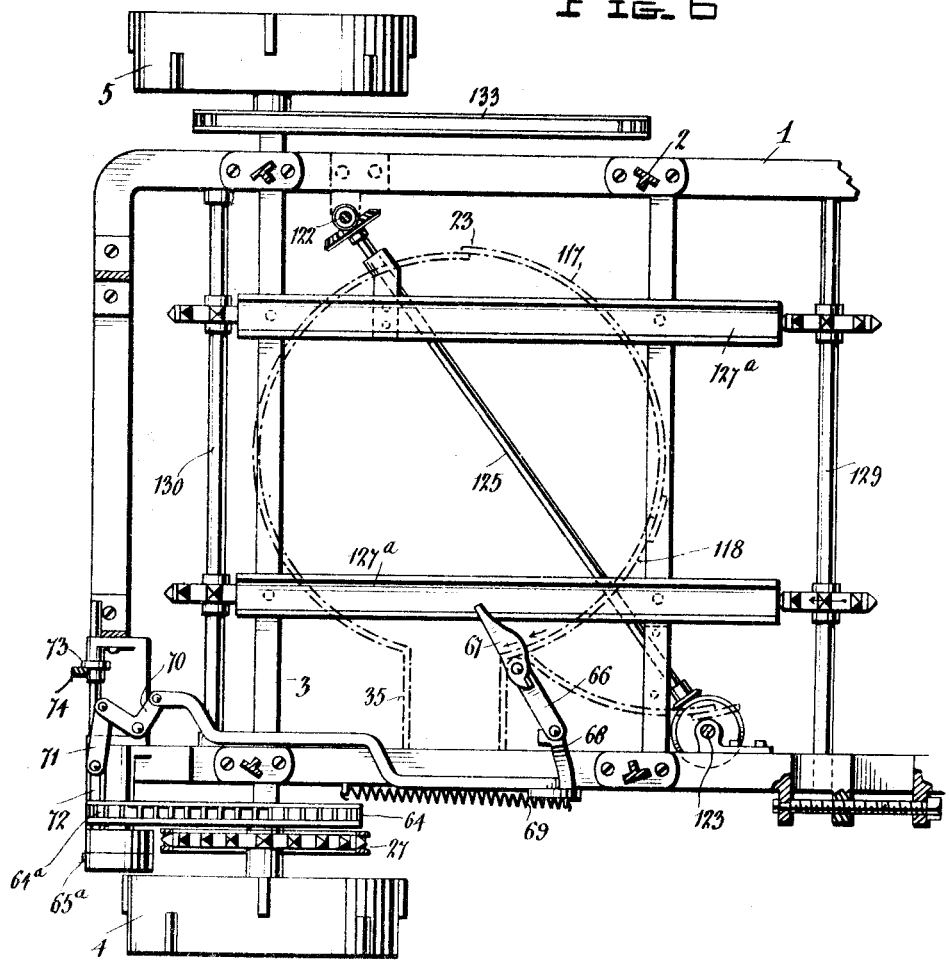
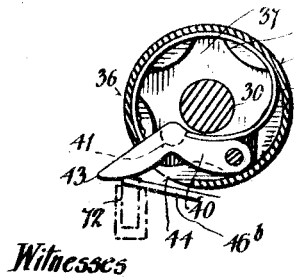
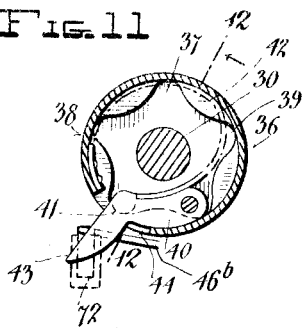
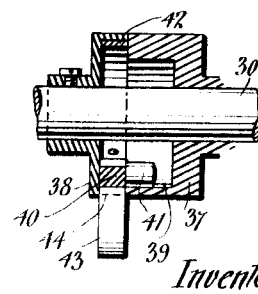
Witnesses
Inventor
Peter Ketelsen
by
Attorney.

P. KETELSEN.
SHOCK FORMING MACHINE.
APPLICATION FILED DEC. 31, 1912.

1,088,592.

Patented Feb. 24, 1914.
12 SHEETS—SHEET 7.

Witnesses

Inventor
Peter Ketelsen
by
Attorney.

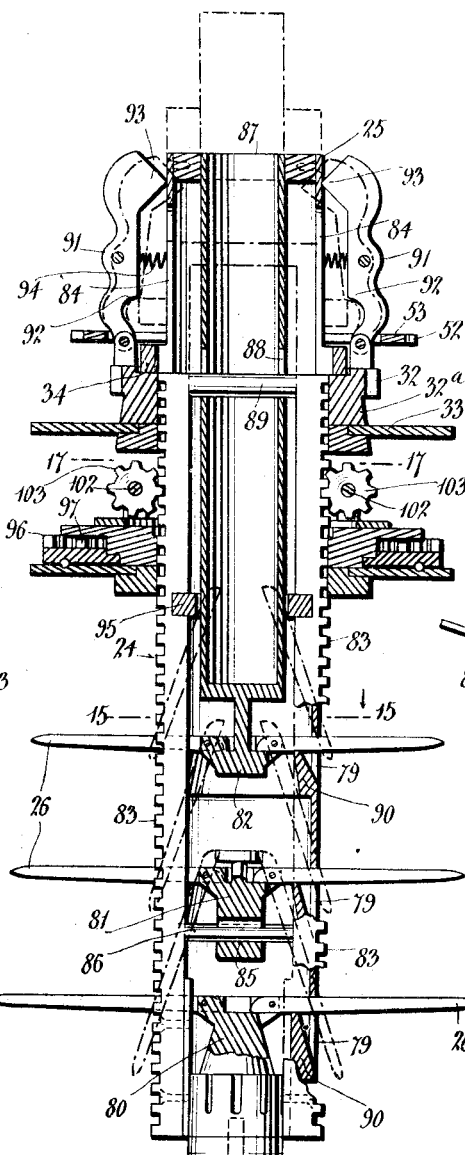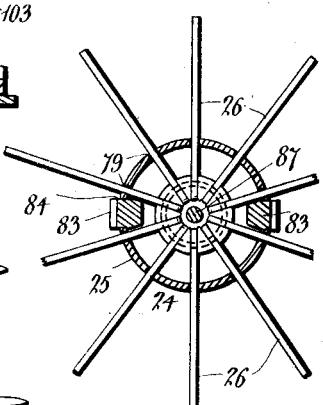

P. KETELSEN.
SHOCK FORMING MACHINE.
APPLICATION FILED DEC. 31, 1912.
1,088,592.
Patented Feb. 24, 1914.
12 SHEETS—SHEET 9.
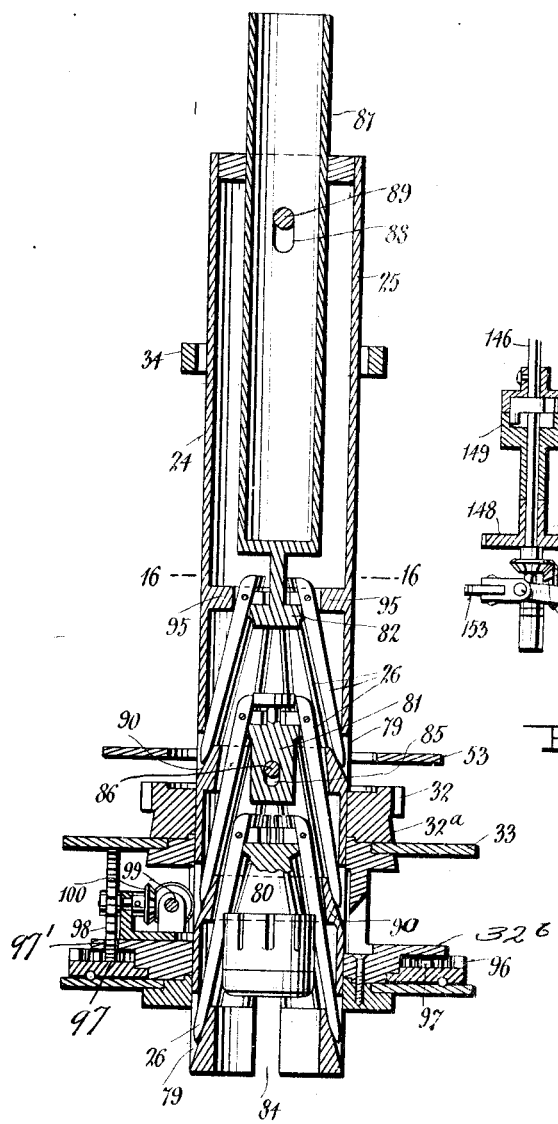
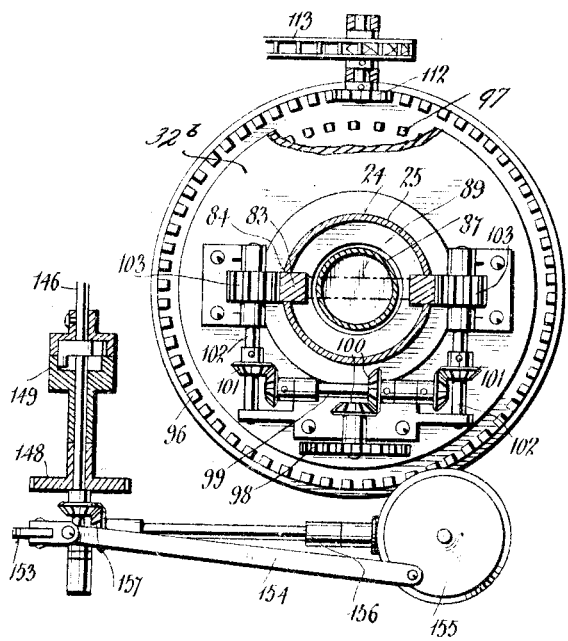
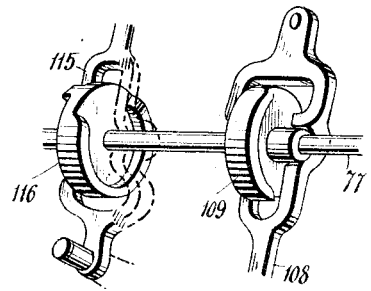
Witnesses,
Inventor
Peter Ketelsen
by
Attorney.

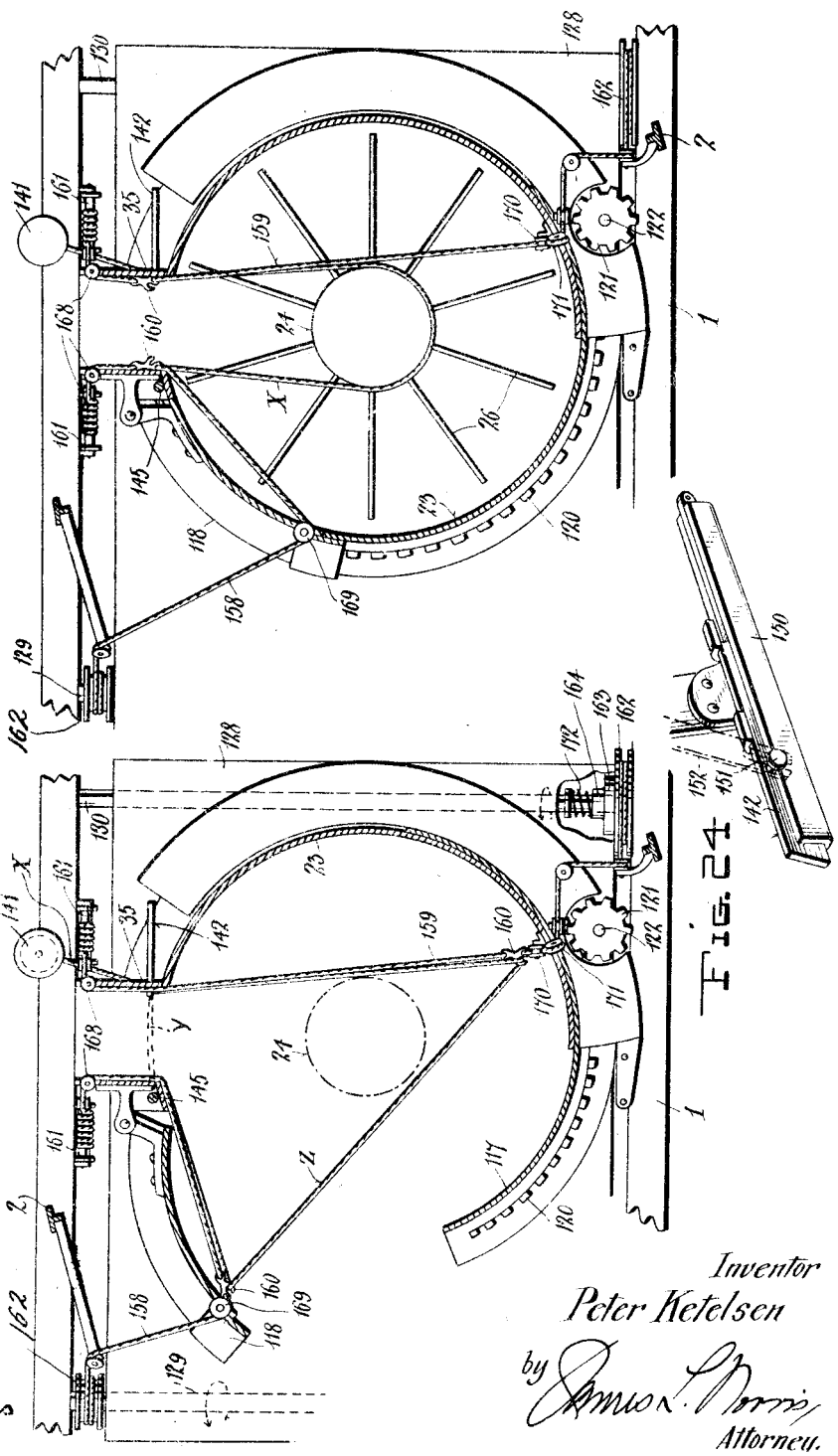

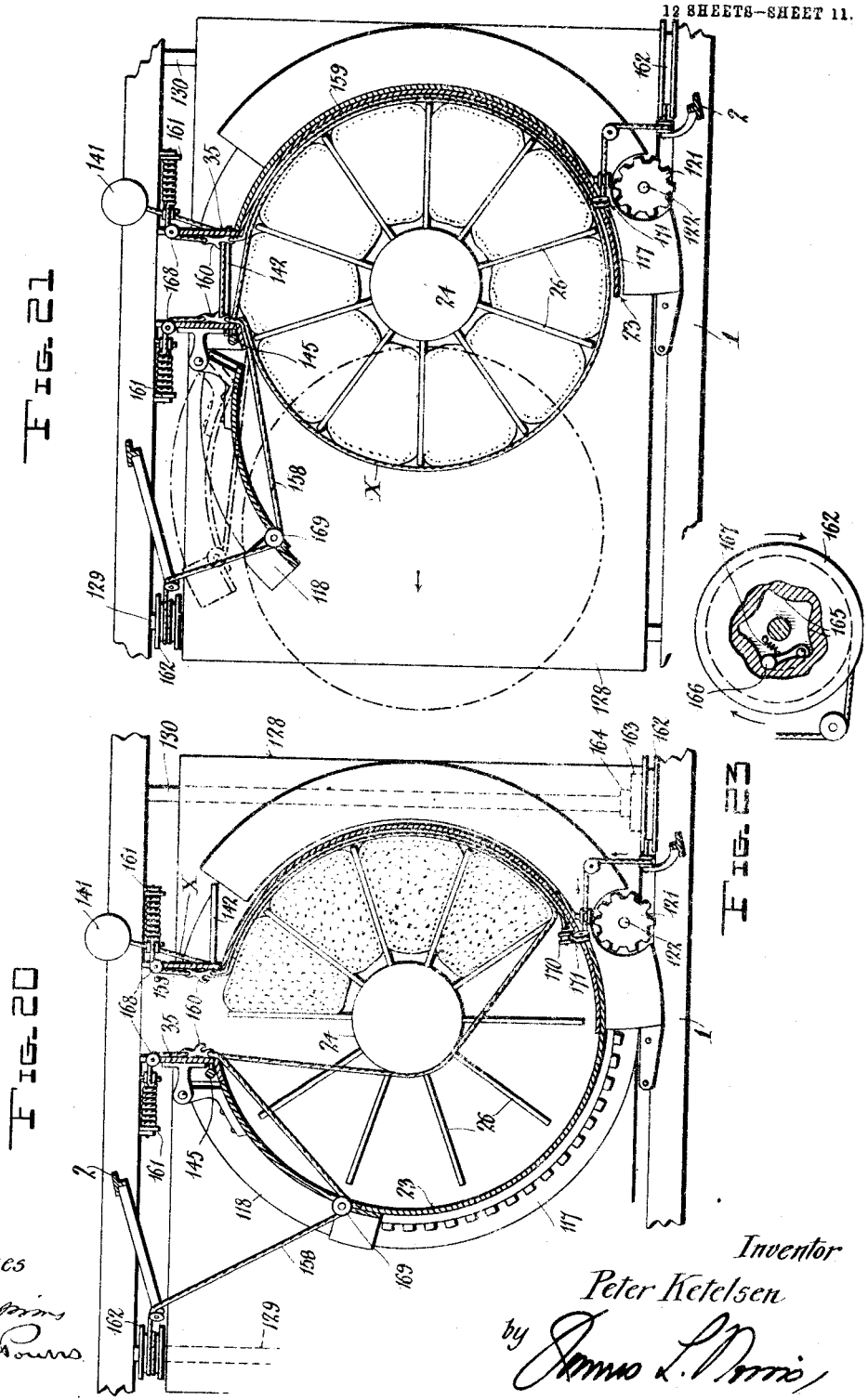

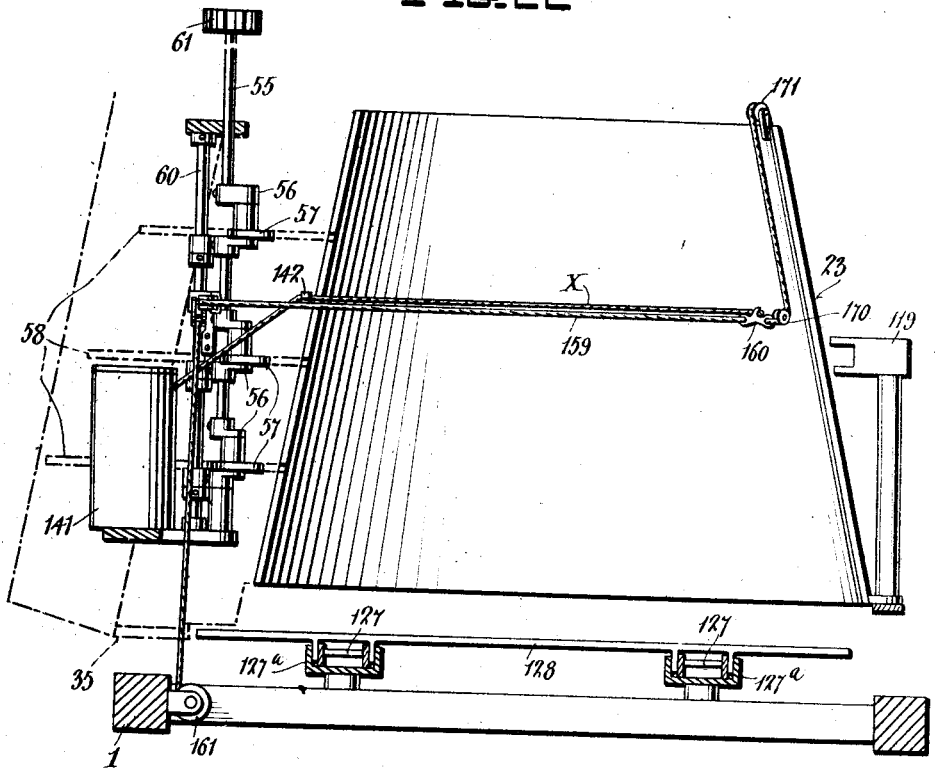

UNITED STATES PATENT OFFICE.

PETER KETELSEN, OF CLINTON, IOWA.

SHOCK-FORMING MACHINE.

1,088,592.  Specification of Letters Patent.  Patented Feb. 24, 1914.

Application filed December 31, 1912. Serial No. 739,532.

*To all whom it may concern:*

Be it known that I, PETER KETELSEN, a subject of the Emperor of Germany, but having formally announced my intention of becoming a citizen of the United States, residing at Clinton, in the county of Clinton and State of Iowa, have invented new and useful Improvements in Shock-Forming Machines, of which the following is a specification.

This invention relates to improvements in shock forming machines, and it proposes a machine which may be connected to the binder to travel therewith and to which the sheaves are passed as they are delivered from the binder.

The improved machine comprises a number of instrumentalities, all correlated toward the end of efficiently producing and delivering shocks of regular contour, in which the sheaves are automatically and securely bound together. Stated generally, these instrumentalities comprise a sheaf conveyer or transferring mechanism which takes the sheaves as they are delivered from the binder, a shock forming mechanism to which the sheaves are passed from the transferring mechanism and by which they are arranged in a well formed shock having a definite number of sheaves, a shock binding mechanism by means of which the sheaves, upon completion of the operation of the shock forming mechanism, are bound and tied, and a shock delivering mechanism by means of which, after the operation of the shock forming and binding mechanisms, the finished shock is delivered from the machine.

In addition to the mechanisms above specified, the invention comprehends means for correlating the action of the mechanisms so that the operations may be performed with certainty and reliability and in definitely timed sequence.

The objects of the invention, generally stated are to produce a completely finished shock by a series of automatically performed operations and by a machine which requires relatively little power for its operation and in which, considering the number and character of the operations involved, mechanism of comparatively simple nature is employed.

Other objects and advantages will appear as the description proceeds.

Figure 8:
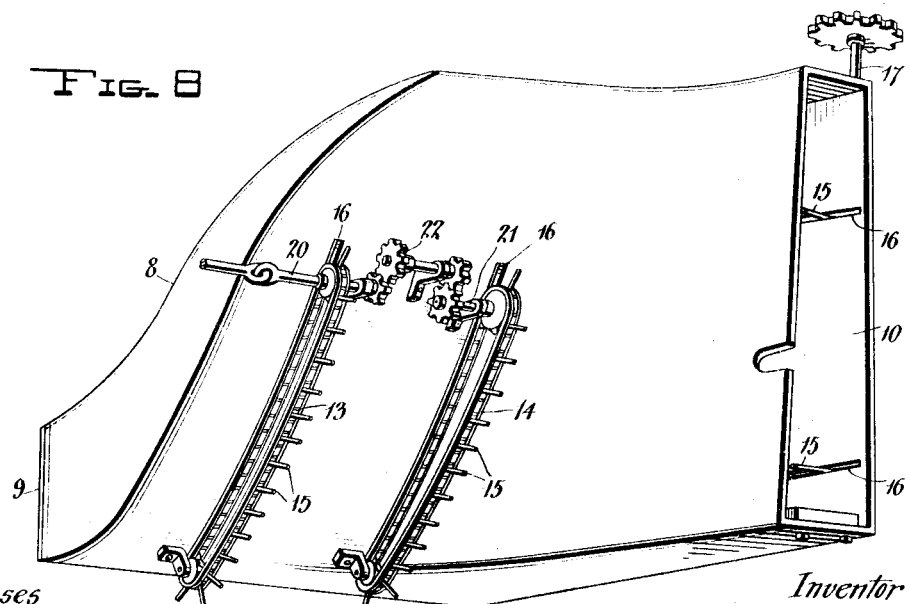

An embodiment of the invention is illustrated in the accompanying drawings, in which:

Figure 1 is an elevation of the machine from that side thereof into which the sheaves are passed. Fig. 2 is an elevation of the machine from the opposite side thereof. Fig. 3 is a front elevation of the machine with certain gear parts shown in section. Fig. 4 is a rear elevation thereof. Fig. 5 is a top plan view thereof. Fig. 6 is a horizontal sectional view on the line 6—6 of Fig. 1, illustrating more particularly the arrangement of the conveyer by which the finished shock is discharged from the machine and the mechanism which controls the action of those instrumentalities which operate subsequent to the completion of the operation of the shock forming mechanism. In this figure, the shock forming mechanism has been omitted for the sake of clearness of illustration, but the casing thereof is indicated generally by dotted lines, in order that its relation may more clearly appear. Figs. 7 and 8 are perspective views of the mechanism by means of which the sheaves are transferred from the binder to the present machine. Fig. 9 is a detail view showing the relation of the endless chains with their sheaf-engaging fingers comprehended in the mechanism shown in Figs. 7 and 8. Figs. 10 and 11 are detail sectional views showing different relations of a pawl and ratchet mechanism, of which a number are employed as connecting devices between different shafts, these mechanisms being automatically controlled to connect or disconnect the shafts with which they are associated. Fig. 12 is a sectional view on the line 12—12 of Fig. 11. Fig. 13 is a vertical central sectional view on the line 13—13 of Fig. 5, showing in detail the inclosed internal mechanism of the shock forming device with the parts thereof related as in the normal or shock forming operation of the machine. Fig. 14 is a vertical longitudinal sectional view of the mechanism shown in Fig. 13, but with the parts thereof related as in the shock binding and discharging operations of the machine. Fig. 15 is a detail horizontal sectional view on the line 15—15 of Fig. 13. Fig. 16 is a detail horizontal sectional view on the line 16—16 of Fig. 14. Fig. 17 is a detail horizontal sectional view on the line 17—17 of Fig. 13. This figure also contains a plan view of certain parts of a device which completes the shock binding operation. Figs. 18, 19, 20 and 21 are plan views of diagrammatic nature, illustrating different stages of the operation of the binding mechanism and different phases of the correlation of this mechanism, the shock forming casing, and the shock discharging conveyer. Fig. 22 is a vertical central sectional view of somewhat diagrammatic nature, illustrating the binding mechanism in the relation thereof shown in Fig. 18, and illustrating also an arrangement of sheaf packers which carry the sheaf into the casing of the shock forming mechanism. Fig. 23 is a detail view, partly in section, of a pawl and ratchet device involved in the binding mechanism. Fig. 24 is a detail perspective view showing the arrangement of the needle which coöperates with the knotter to knot the cord which has been wound about the shock by the action of other parts of the binding mechanism. Figs. 25, 26 and 27 are detail plan views of somewhat diagrammatic nature, illustrating the several sheaf packers by means of which the sheaf is carried into the casing of the shock forming mechanism. Fig. 28 is a detail perspective view showing a cam shaft and certain clutch shifting appurtenances operated thereby.

Similar characters of reference designate corresponding parts throughout the several views.

The various operating parts are supported with relation to a frame which comprises a rectangular skeleton base, as 1, and an upright skeleton tower 2, carried by the base. The base 1 is constructed to provide bearings for an axle 3 which is located at the front of the machine and which carries at its ends the traction wheels 4 and 5. At the rear end of the base caster wheels 6, by means of which the steering of the machine is facilitated, are provided. Inwardly of the caster wheels 6 there are preferably arranged auxiliary traction wheels 7 which come into action only when the machine is passing over rough ground.

The power for operation may be derived from any suitable source. It is convenient and practical, however, to obtain the power for operation from the traction wheels 4 and 5, and the connections by which these traction wheels are utilized for this purpose will be hereafter explained.

*Transferring the sheaves from the binder.*—The binder may be of any suitable construction and it is not deemed necessary to show any of the parts thereof in the drawings. It is sufficient to say that the sheaves are delivered at one side of the binder in a horizontal position. Between the shock forming machine of the present invention, and which, as stated, travels with the binder, and the binder platform, there is interposed a sheaf conveyer or transferring mechanism which, in the instance disclosed, is carried by the shock forming machine and includes essentially a casing 8 which has a horizontally disposed sheaf receiving end 9 and a vertically disposed sheaf discharging end 10. The sheaf conveyer or transferring mechanism also comprises an arrangement of endless chains on the opposite sides of the casing 8, which are provided with fingers that work through slots in said casing, and the office of these chains and their sheaf engaging fingers is both to feed sheaves through the casing and, continuously with their feeding action, to change the sheaves from the horizontal position in which they enter the casing 8 into a vertical position, in which they are discharged from the casing 8.

Figs. 7 and 8 show more particularly the elements above mentioned, Fig. 7 showing the chains at one side of the casing and Fig. 8 showing the chains at the opposite side of the casing. The chains shown in Fig. 7 are designated by the numerals 11 and 12 and are horizontally disposed, the chain 11 being arranged above the chain 12. The office of the chains 11 and 12 is to effect the ultimate discharge of the sheaves in a vertical position from the casing 8. The chains shown in Fig. 8 are arranged at the opposite side of the casing 8 and are designated by the numerals 13 and 14. The chains 13 and 14 are vertically disposed and their office is to engage the sheaves as they enter the mouth of the casing 8 and to coact with the chains 11 and 12 in feeding the sheaves through said casing and in turning the sheaves from a horizontal to a vertical position. The several chains 11, 12, 13 and 14 are provided with sheaf-engaging fingers 15, which work through slots 16 in the walls of the casing 8, as shown more particularly in Fig. 9.

In order that the sheaves may be efficiently turned from a horizontal into a vertical position in their passage from the casing 8, as above described, the action of each pair of parallel chains should be differentiated; that is to say, the chain 11 should move at a considerably greater rate of speed than the chain 12, and the chain 13, which is more remote from the discharge end 10 of the casing than the chain 14, should move at a considerably greater rate of speed than the latter. Thus, between the vertical drive shafts 17 and 18 of the respective chains 11 and 12, suitable speed reducing gearing 19 is interposed, and in like manner, between the horizontal drive shafts 20 and 21 of the chains 13 and 14, suitable speed reducing gearing 22 is interposed.

As a matter of convenience, the drive shaft 20 of the chain 13 may be driven by suitable connections from any desired continuously rotating shaft or part of the binder, and the drive shaft 17 of the chain 11 may be driven from the traction wheel 4. It is not regarded as necessary to show the driving connections for the shaft 20, but the driving connections for the shaft 17 will be referred to at a later point.

*The shock forming mechanism and its appurtenances.*—The shock forming mechanism includes essentially an upright casing 23 which is open at its upper and lower ends and is preferably in the form of a truncated cone, and an internal sheaf disposing mechanism, designated generally by the numeral 24, which is in coaction with the casing 23 to arrange a determined number of sheaves in orderly fashion in a compact and symmetrical group. The sheaf disposing mechanism is shown in detail in Figs. 13 and 14, and includes a cylindrical core 25 having associated therewith a number of disposing arms 26. In the normal operation of the shock forming mechanism, the core 25 is disposed within the casing 23 with the arms 26 projecting horizontally and radially therefrom, and said core and therewith, said arms, are intermittently rotated. The arms 26 are arranged in vertical rows and any suitable number of said arms may make up a row. Thus, in the embodiment shown, there are three arms in each vertical row. The number of rows of arms 26 will depend upon the number of sheaves which will constitute a shock. The drawings assume a shock composed of ten sheaves, and for this reason there are ten vertical rows of arms 26. In the operation of the shock forming mechanism, the sheaves, as they are successively delivered into the casing 23 from the sheaf conveying and transferring mechanism, engage between adjacent rows of arms 26, and after each sheaf has thus been positioned between a pair of adjacent rows of said arms, the core 25, and therewith the arms, are rotated for a fraction of a revolution to present the next sheaf-receiving space to the next sheaf which is fed into the casing 23. The core 25, in addition to its rotating movement, has also axial movements, upwardly and downwardly, and during the upward axial movement of said core, the arms 26 are retracted. The axial movements of the core 25 are not concerned with the formation of the shock, but rather with the delivery of the shock, and for this reason are simply adverted to at the present time, their detailed explanation being reserved for a later portion of the description.

The rotation of the core 25 may be conveniently effected from the traction wheel 4 by suitable reducing gearing. Thus, the hub of said traction wheel is connected by sprocket gearing 27 to a horizontal shaft 28 on the same side of the machine as the traction wheel 4, and the shaft 28 is connected by sprocket gearing 29 to a horizontal shaft 30, which is supported on the top plate of the tower 2. The shaft 30 effects the rotation of the core 25, and for this purpose said shaft is provided with a worm 31 which engages a worm wheel 32 on the upper portion of the core 25. The worm wheel 32 is keyed upon the core 25 and has an extended hub portion 32ª by means of which it is supported on a bearing plate 33 which is secured at the top of the tower 2. The worm wheel 32 also furnishes support for the core 25 in the lowermost position thereof, said core for this purpose being provided with a suitably located circumscribing ring 34 which, in the normal operation of the shock forming mechanism, rests upon the upper face of the worm wheel 32. The casing 23 has at one side thereof a vertically disposed sheaf-receiving extension 35, which, in effect, forms a continuation of the casing 8, the discharge end of the latter being fitted directly against or within said extension.

The shaft 30 is, as above stated, intermittently driven from the traction wheel 4, and for this purpose, the sprocket 29ª, which forms a part of the gearing 29 between the shafts 28 and 30, is loose on the shaft 30 and is alternately connected and disconnected therefrom by a suitable means. This means may conveniently be in the nature of a pawl and ratchet clutch, designated generally by the numeral 36, and of a construction such as is shown in Figs. 10 to 12. The clutch 36 comprises abutting cup-shaped parts 37 and 38, the part 38 being fast on the shaft 30 and the part 37, upon which the sprocket wheel 29ª aforesaid is mounted, being loose on the shaft 30. The part 37 has an internal arrangement of notches 39, and the part 38 has internally pivoted therein a lever 40 having a pawl-like extension 41 for engagement in the notches 39. The lever 40 is actuated by a suitable spring 42 secured within the part 38 to engage its extension 41 with the notches 39, and is provided with an arm 43 which projects through a slot 44 in the annular wall of the part 38 for engagement by a part which is effective to move said lever inwardly against the tension of the spring 42 and thereby disengage the extension 41 from the notches 39 and permit the sprocket 29ª and therewith the clutch part 37 to run free of the shaft 30.

The above described relations of the clutch parts 37 and 38 are varied by mechanism which, in one operation, is actuated by the sheaf in coming through the extension 35. A simple and preferred form of such mechanism is shown in the drawings, which comprises a vertical rock shaft 45 mounted at one side of the extension 35, and a Y-shaped lever 46 pivoted to the top of the tower 2. The shaft 45 has at its lower end an arm 47 which works through alining horizontal slots 48 in the adjacent walls of the extension 35, and the casing 8, and projects across the extension 35. The shaft 45 has at its upper end an arm 49 to which is connected a spring 50 for holding said shaft in a normal position. The arm 49 carries a pin 51 to effect the operation of the lever 46. The lever 46 is provided with three arms 46$^a$, 46$^b$, and 46$^c$. The arm 46$^a$ has at its end a finger 46$^d$ which is engaged at times by the pin 51; the arm 46$^b$ has its end formed to engage the projecting arm 43 of the pawl lever 40; and the arm 46$^c$ has at its end a finger 46$^e$ for engagement in any one of a series of notches 52 in a notch ring 53, which is secured to the worm wheel 32 to turn therewith, and with the core 25. The lever 46 is connected to a spring 54, the office of which is to move said lever whereby its arm 46$^b$ is in the path of the pawl-arm 43, and the finger 46$^e$ will engage in an adjacent notch 52. The pin 51 operates the lever 46 against the tension of the spring 54.

Fig. 5 shows the lever 46 in such a position that the fingers 46$^e$ of its arm 46$^c$ is engaged in a notch 52. When this relation obtains the sprocket 29$^a$ runs free of the shaft 30, and the latter is consequently idle. However, when a sheaf passes through the extension 35 it engages the arm 47 of the shaft 46, and thereby rocks said shaft against the tension of the spring 50, with the result that the pin 51, engaging against the finger 46$^d$ on the arm 46$^a$ of the lever 46, rocks the lever 46 against the tension of its spring 54, and thereby moves the arm 46$^b$ out of engagement with the pawl-arm 43, and the fingers 46$^e$ of the arm 46$^c$ out of engagement with the notch 52 of the ring 53. When this relation obtains the spring 42 moves the pawl lever 40, to the position shown in Fig. 11, in which position its extension 41 engages in an adjacent notch 39 and thereby connects the clutch part 38 for rotation with the clutch part 37. Thereupon the shaft 30 is rotated by the sprocket wheel 29$^a$. When the sheaf which, by thus engaging the arm 47 has produced the operations referred to, passes by said arm, the spring 50 returns the rock shaft 45, and therewith the arm 47, to normal position. The lever 46, however, is held in the position to which it has been moved by the pin 51 by virtue of the engagement of the finger 46$^e$ against the periphery of the notch ring 53, until such time as the next notch 52 in said ring comes adjacent said finger, and thereupon the spring 54 resets the lever 46, establishing the relation shown in Fig. 5, and causing the engagement of the finger 46$^e$ of the arm 46$^c$ in the notch 52 just presented thereto, as well as the positioning of the arm 46$^b$ in the path of the pawl-arm 43. When the finger 46$^e$ engages in the notch 52, the pawl-arm 43 engages against the end of the arm 46$^b$ and thereby the pawl lever 40 is moved from the position of Fig. 11, into the position of Fig. 10, in which its extension 41 disengages the notches 39. At such time, the sprocket wheel 29$^a$ runs free of the shaft 30 and the latter is idle. Each successive sheaf acts through the intermediary of the arm 47 and shaft 45 to operate the lever 46 in the manner stated. The notches 52, which provide for the resetting of the lever 46, of course control the disconnection of the shaft 30 from the sprocket wheel 29$^a$, such disconnection taking place each time that an empty sheaf-receiving space between adjacent sheaf disposing arms 26 is presented in line with the extension 35. It is, of course, apparent that the number of notches 52 must correspond to the number of sheaf-receiving spaces between the sheaf disposing arms 26, which, in the present instance, is ten. To move a sheaf from the extension 35 into the sheaf receiving space between adjacent arms 26 presented to said extension, the following mechanism is preferably employed. On the side of said extension, adjacent the front of the machine, there is mounted a vertical shaft 55 having at suitable intervals thereon crank arms 56, which form pivots for the sheaf packers 57, of which three are employed in the instance disclosed. The packers 57 work through slots 58 in the adjacent wall of the extension 35, and are extended forwardly beyond the crank arms 56 and at their forward ends pivoted to arms 59 on a suitably supported vertical rock shaft 60. The shaft 55 may be conveniently driven from the shaft 30 by suitable transmission gearing, designated by the numeral 61. Each operation of the shaft 30 thus not only effects the partial rotation of the core 25, but it also effects a suitable number of revolutions of the shaft 55, as a consequence of which the packers 57 are alternately advanced and retracted to effect the movement of a sheaf between adjacent sheaf disposing arms 36. Figs. 25, 26 and 27 show the sheaf packers 57 in detail. It will be observed that the extension 35 gradually widens toward its lower end, and that the wall in which the slots 58 are provided is somewhat inclined. In view of this, the packers 57 must be set at different angles with reference to the arms 59, to which they are pivoted at their forward ends, in order that they may all be completely retracted from the extension 35 and may thus not interfere with the movement of a sheaf into said extension from the casing 8. Fig. 25 shows the uppermost packer 57, Fig. 26 the intermediate packer 57, and Fig. 27 the lowermost packer 57. It will be observed from these figures that the angles which said packers form with the arms 59 gradually decrease from the uppermost to the lowermost of said packers, and in this way compensation is made for the inclination of the adjacent wall of the extension 35, and it is assured that said packers may be wholly retracted from said extension as well as substantially uniformly projected across the same, the projected relation of said packers being indicated by dotted lines in the three figures mentioned. The packers 57, by virtue of their connection to the crank arms of the shaft 55 and to the arms 59 on the rock shaft 60, are moved in a more or less elliptical path throughout the length of the extension 35 and in their movement toward the casing 23, they project across said extension, being retracted at the completion of said movement and maintained in retracted relation during their movement in a reverse direction, or away from the casing 23; and at the end of this reverse movement they are again projected across the extension 35 and moved toward said casing. In this way each sheaf, as soon as it has engaged the arm 47 and thus set the parts described in operation, is advanced by packers 57 into the sheaf-receiving space between adjacent arms 26, presented to the extension 35. The arms 26 are at the same time turning with the core 25, but as said core turns relatively slowly, and as the packers 57 operate with rapidity, the turning of the arms 26 with the core does not interfere with their effective reception of the sheaf which is being advanced by the packers 57. At this point it may be noted that the chain 29$^b$ which rotates the sprocket 29$^a$ is also utilized as an element of the gearing for operating the drive shaft 17 of the sheaf conveyer chain 11, such gearing being designated generally by the numeral 62 and being of suitable change speed character.

As above stated, the shock forming mechanism has a capacity for ten sheaves and when ten sheaves have been fed into the casing 23 in the manner stated, so that all the spaces between adjacent rows of arms 26 are taken up, the other instrumentalities of the machine come into action automatically and in definite sequence or relation.

*The automatic control of the operations subsequent to the shock forming operation.*— Except for the shock forming mechanism above described, the operation of the instrumentalities of the machine is controlled directly or indirectly, as the case may be, from a transverse shaft 63 which is driven at intervals by gearing 64 from the traction wheel 4. The gearing 64 includes an automatically controlled clutch 65 of suitable construction, for instance, being exactly similar to the pawl and ratchet clutch 36 shown in Figs. 10, 11 and 12 and above described, the sprocket 64$^a$ of said gearing and by which the shaft 63 is rotated, being provided upon the loose member of said clutch. The spring-pressed pawl lever of the clutch 65 has a projecting arm 65$^a$, similar to the arm 43 of the clutch 36.

The engagement and disengagement of the clutch 65 are automatically controlled, for example, by the following organization of elements. At the rear side of the extension 35 is pivotally mounted an arm 66 and coaxially therewith there is mounted a lever 67 which projects through a slot 68' in the adjacent wall of the casing 23 and has its butt end fashioned to engage a pin on said arm. As the tenth sheaf, i. e. the one which completes the shock, is introduced into the shock forming mechanism, the first sheaf thus introduced into said mechanism is being moved in line with the extension 35 and in such movement engages the lever 67 and rocks the same in the direction indicated by the arrows in Fig. 6, thereby causing said lever to move the arm 66 in an opposite direction. The arm 66 has connected thereto one end of a substantially L-shaped member 68, at the angle of which a resetting spring 69 is connected. The horizontal portion of the L-shaped member projects toward the front of the machine and at its extremity is connected to a bell crank lever 70, which in turn is connected by means of a link 71 with a horizontal slide 72. The slide 72 has its outer end suitably fashioned to engage the projecting arm 65$^a$ of the clutch 65, and to act on said arm whereby to effect the disconnection of the members of said clutch in the manner already explained. The movement of the lever 67 by the sheaf passing adjacent thereto in the manner above explained is effective, through the connecting devices described, to cause the disengagement of the slide 72 from the arm 65$^a$, and thereby the spring-pressed pawl lever is caused to establish the operative connection of the members of the clutch 65. At such time the shaft 63 is driven from the traction wheel 4. The slide 72 is provided with a collar 73 which, after said slide has been disengaged from the pawl arm 65$^a$ in the manner above explained, is engaged by a pivotally mounted detent 74, the latter thus holding the slide 72 retracted against the tension of the spring 69. The engagement of the detent 74 with the collar 73 is effected by a cam 75 and the disengagement of said detent from said collar is effected by a spring 76, at such time as the upper end of the detent enters the depression 75$^a$ of the cam 75. Manifestly, when the detent 74 is thus disengaged from the collar 73, the spring 69 acts to reset the parts and to project the slide 72 into the path of the pawl arm 65$^a$, whereby the rotation of the shaft 63 will be arrested.

The cam 75 is mounted upon what may be termed for convenience a cam shaft 77, which is arranged transversely at the forward end of the machine and above the shaft 63, being driven from the latter by a suitable gearing 78. The cam shaft 77 not only carries the cam 75, but it also carries other cams which control other instrumentalities of the machine and to which reference will be made as the description proceeds.

*General consideration of the subsequent operations.*—Operations subsequent to the formation of a shock are concerned with the binding and discharging of the finished shock. The casing 23 is normally closed, but its conical wall includes in its makeup automatically controlled displaceable parts or gates. In the delivery of the shock the first action is to raise the sheaf disposing mechanism 24 and at the same time to retract the sheaf disposing arms 26. This operation frees the shock from the core 25 and during the raising of the sheaf disposing mechanism, the displaceable members or gates of the casing 23 are moved to open position. Thereafter, the conveyer which forms the base of the casing 23 and upon which the finished shock will be supported is operated to carry the shock through the now open gates of the casing 23 and to discharge the same through the rear end of the machine. The binding of the shock proceeds continuously with the shock forming operation; and during the raising movement of the sheaf disposing mechanism, the binding operation is completed by a suitable knot tying and cord cutting device. Thereafter, the binding mechanism acts in preparation for the shock next to be formed. When the finished shock has been delivered by the conveyer, the movement of the conveyer is arrested; the sheaf disposing mechanism returns to its position within the casing 23, the displaceable members or gates of the casing 23 are moved to closed position, all the collateral connections and mechanisms are reset, and finally, the operation of the shaft 63 is arrested, at which time the shock forming mechanism is actuated to form another shock in the manner already explained.

*Details of construction and operation of the sheaf disposing mechanism.*—The core 25 is in the form of a hollow cylinder and the arms 26 are carried by devices arranged within the core and project radially from the core through slotted openings 79 therein. It will be observed that the arms 26 progressively increase in length toward the lower end of the core and that when these arms are retracted, their inner ends are raised. In order that the extremities of the arms may always find the openings 79, it is essential that their extremities should, when said arms are retracted, be substantially flush with the outer surface of the core. In the case of arms which increase in length toward the lower end of the core, as shown herein, this relation is obtained by starting the retracting movement of the horizontal tiers of arms at different stages. Thus, the lowermost tier of arms 26 is first retracted, shortly thereafter the retraction of the intermediate tier of arms 26 commences, and lastly, the retraction of the uppermost tier of arms commences. The several tiers of arms are carried by runners 80, 81, and 82, which are inclosed within the core 25 and to which the inner ends of the arms 26 are pivoted and related in the same manner as are the ribs of an umbrella to the runner or thimble thereof. The runners 80, 81 and 82 are actuated by vertically disposed rack bars 83 which are fitted and movable in oppositely arranged slots 84, formed longitudinally of the core 25. The rack bars 83 are fixedly connected to the lowermost runner 80, so that when said rack bars start to move the runners 80 will move therewith. Suitable play, however, is provided between the rack bars 83 and the intermediate runner 81 and the uppermost runner 82. Thus, the runner 81 has a depending shank which is formed with a slot 85. The rack bars 83 are connected by a transverse pin 86 which passes through the slot 85. A similar connection is provided between the rack bars and the uppermost runner 82. The runner 82 is preferably, though not necessarily, provided at the lower end of a rod or tube 87, which extends axially to the upper end of the core 25 and is provided to assist in maintaining the rack bars 83 centered and in guiding said rack bars in their movements axially of the core 25. The rod 87 is formed at a suitable point with a slot 88 and the rack bars 83 are connected by a pin 89 which passes through the slot 88. The slot 88 is of substantially greater depth than the slot 85. It will be apparent that when the rack bars are moved upwardly in the slots 84 and relatively to the core 25, the runner 80 will start to move therewith and before the runners 81 and 82, so that the lower pair of arms 26 is first started in its retracting movement. Shortly after the start of the upward movement of the rack bars 83, the pin 86 will engage the upper wall of the slot 85 and thereby will start the retracting movement of the intermediate pair of arms 26. Shortly after the retracting movement of the intermediate tier of arms 26 is commenced, the pin 89 will engage the upper wall of the slot 88 and thereby will start the retracting movement of the uppermost tier of arms 26. It will thus be seen that the retracting movements of the several tiers of arms 26 start in successive order from the lowermost tier of said arms to the uppermost tier of said arms, and in this way, taking into consideration the fact that the arms gradually decrease in length from the lowermost to the uppermost tier, the extremities of said arms will, when the arms are retracted, be substantially flush with the surface of core 25, and hence, in alinement with the openings 79. Adjacent the openings 79 and fixedly secured to the inner face of the core, are arm keepers 90 which are of semicircular outline and are arranged in pairs at opposite sides of the rack bars 83. The arm keepers 90 are frusto-conical, and in their upper surfaces are provided with arm receiving grooves which aline with the several openings 79 and in which the extremities of the arms 26 fit when the arms are in retracted relation, as shown more particularly in Fig. 14.

It will be observed from Fig. 13 that the slots 84, in which the rack bars 83 work, are of substantially greater depth than said rack bars. During the raising of the sheaf disposing mechanism, the rack bars are first moved to the upper end of the slots 84 and with relation to the core 25. Thereafter, when the rack bars have engaged the upper ends of the slots 84, in their further upward movement, they will carry the core 25 therewith, so as to retract the core from the finished shock. It is preferred to employ positive means for holding the core 25 against upward movement during the movement of the rack bars 83 toward the upper end of the slots 84, and in case the weight of said core should not be sufficient for this purpose. The means for positively holding the core 25 against upward movement during the period referred to preferably and conveniently comprises a pair of core detents 91, (Figs. 1, 5, and 13) which are pivotally mounted, for example, on the upper face of the worm wheel 32, in line with the slots 84. The detents are provided adjacent their lower ends with shoulders 92 which, when said detents are drawn inwardly engage the ring 34 which is carried by the core 25 and thereby positively arrest the upward movement of said core. At their upper ends the detents 91 are provided with noses 93, the faces of which are inclined. When the movement of the rack bars 83 is first started, the arms 26 will carry the core therewith for a very slight distance, only sufficient to bring the slots 84 into line with the noses 93. Thereupon the springs 94, which connect said detents, will move the detents inwardly, the noses 93 then entering the slots 84, as shown by dotted lines in Fig. 13, and the shoulders 92 engaging over the ring 34. The upward movement of the core is thus positively arrested, while the rack bars 83 move toward the upper ends of the slots 84. Ultimately, the upper ends of said rack bars will engage the adjacent inclined faces of the noses 93 and will thereby move the detents 91 outwardly against the tension of their springs 94, so as to disengage the shoulders 92 from the ring 84, and to permit the core 25 to be raised by the rack bars when the latter engage the upper ends of the slots 84. In addition to supporting the core 25 from the rack bars 83 by the engagement of the upper end of said rack bars against the upper ends of the slots 84, it is preferred for the same purpose, to provide the core with internally arranged supporting blocks 95, disposed at opposite sides of the rack bars 83, and between which and the adjacent arm keepers 90 the arms 26 of the uppermost tier will bind. Obviously, when the sheaf disposing mechanism is lowered, the movement of the core 25 will be ultimately arrested by the engagement of its ring 34 on the worm wheel 32, and thereafter the rack bars 83 will move downwardly along the slots 84 and with relation to said core and in such relative movement will effect the projection of the arms 26 through the openings 79 and into horizontal operative positions.

*The gearing for raising and lowering the sheaf disposing mechanism.*—A train of the gear organization for producing the upward and downward axial movements of the sheaf disposing mechanism is arranged under the top plate of the tower 2 and is supported from and rotatable with the worm wheel 32. The gear train thus supported, as shown more particularly in detail in Figs. 14 and 17, comprises horizontal concentric crown gears 96 and 97, both of which may be conveniently arranged upon or formed as parts of a common plate or wheel. The outer crown gear 96 is driven alternately in opposite directions by a train of gearing to be hereafter described, and the inner crown gear 97, of course, rotates therewith. The inner crown gear 97 is in mesh with and rotates a spur wheel 98. The spur wheel 98 drives a horizontal shaft 99 through miter gearing 100, and the shaft 99, through similar miter gearing 101 at the ends thereof, drives a pair of parallel shafts 102, each of which carries a pinion 103 for engagement with an adjacent rack bar 83. It is apparent that if the crown gear 96 be turned clockwise, the rack bars 83, and ultimately therewith the core 25, will be raised, and if said crown gear be turned counter-clockwise, the rack bars 83 and therewith the core 25 will be lowered. As shown in Fig. 14, the gearing which comprises the elements 98, 99, 100, 101, 102, and 103 is mounted upon a plate $32^b$ which is supported from the worm wheel 32 and overlies the inner crown gear 97, this plate having a slot 97' through which the spur wheel 98 projects into engagement with said crown wheel.

Automatic reversing gearing is provided to act at suitable times in changing the rotation of the crown wheel 96 from clockwise to counter-clockwise, and vice versa. Such gearing is preferably of the following organization, as best shown in Fig. 3. Above the shaft 63 there is arranged a horizontal shaft 104 which is driven alternately in opposite directions from the shaft 63. Sprocket gearing 105 is employed to drive the shaft 104 in the same direction as the shaft 63, and pinion gearing 106 is employed to drive the shaft 104 in an opposite direction from the shaft 63. The sprocket wheel and pinion on the shaft 104 of the respective gearing 105 and 106 are loose on said shaft, and have their hubs formed with clutch faces between which there is arranged a clutch member 107. The clutch member 107 is slidably keyed on the shaft 104, and is movable to establish the operative connection of said shaft, either with the sprocket gearing or with the pinion gearing 106. The movements of the member 107 are effected by a shifting lever 108, pivotally supported at its upper end and in turn controlled by a cam wheel 109 on the cam shaft 77. The lever 108 is provided with an intermediate frame in which the cam wheel 109 is arranged, and said cam wheel has contiguous semi-circular formations on its opposite faces which alternately engage the opposite sides of the frame portion of the lever 108 and thus move said lever in opposite directions to vary the relation of the clutch member 107.

The shaft 104 is used to drive a horizontal shaft 110, which is conveniently located near the upper end of the tower 2, chain and sprocket gearing 111 being employed as operative connections between said shafts. The shaft 110, in turn, serves to drive the crown gear 96, and thereby the gear train for raising and lowering the shock disposing mechanism, the connections for this purpose comprising a pinion 112 which is in mesh with the crown gear 96 and chain and sprocket gearing 113 between said pinion and the shaft 110. The shaft 110 is loose with relation to the sprocket 111$^a$ of the gearing 111, and is automatically put in operative and inoperative relation to said sprocket. For this purpose the sprocket 111$^a$ has a clutch face at one side thereof, which coacts with a clutch member 114 slidably keyed on the shaft 110. The clutch member 114 is controlled by a shifting lever 115 which is pivotally mounted at its lower end and has an intermediate frame formed as a part thereof. The lever 115 is in turn operated by a cam 116 mounted on the shaft 77 and disposed in the frame of said lever. The engagement of the clutch member 114 with the sprocket 111$^a$ is effected almost immediately after the commencement of the rotation of the shaft 63, and is disestablished very shortly before the rotation of the shaft 63 is arrested. For this reason the cam 116 has a cam formation at one side thereof of relatively long extent, which establishes the engagement of the clutch member 114 with the sprocket 111$^a$, and a mere cam point at the other side thereof which effects the disengagement of the member 114 from the sprocket 111$^a$, and is suitably located with reference to the cam formation first mentioned. The reason that the shaft 110 is driven by means of clutch connections from the sprocket 111$^a$ is to enable said shaft to be disconnected from said sprocket during the operation of the shock forming mechanism, whereby it will simply rotate idly consequent to the rotation of the crown gear 96 with the worm wheel 32, from which said crown gear and the associated gear train have support, as above stated. At this point, it may be noted that the cam shaft 77 has but a single revolution to control all operations subsequent to the shock forming operation. For this reason, the gearing 78 which drives said shaft 77 from the shaft 63 is of speed-reducing character. This gearing may be of any suitable construction, but as shown in Fig. 3, it comprehends a number of inter-related chain and sprocket gears, of which the first sprocket 78$^a$ is fast on the shaft 63, and the last sprocket 78$^b$ is fast on the shaft 77. A pair of connected sprockets 78$^c$ is, with convenience, loosely mounted on the shaft 104 and the other pair of connected sprockets 78$^d$ is similarly mounted on the shaft 63.

*Discharging the shock—Opening and closing the casing of the shock forming mechanism.*—As above stated, the casing 23 includes displaceable wall parts or gates. These are designated by the numerals 117 and 118 and are shown more particularly in Figs. 4 and 5. As a matter of convenience, the gate 117 is slidably mounted and is of curved form, its contour and sliding path following the annular outline of the stationary portion of the casing 23, which stationary portion is provided at its upper and lower ends with guide flanges 119 (Fig. 3) between which the gate 117 is held. The gate 118 adjoins the extension 35 and may be conveniently hinged to a wall of said extension. During the upward movement of the sheaf disposing mechanism, as above explained, the gates 117 and 118 are opened; that is to say, the gate 117 is retracted and the gate 118 is swung outwardly on its hinge joints; and during the downward movement of the sheaf disposing mechanism, the gates 117 and 118 are closed; that is to say, the gate 117 is projected and the gate 118 is swung inwardly on its hinge joints until its marginal portion engages the adjacent marginal portion of the gate 117. It will thus be seen that the opening and closing actions of the gates 117 and 118 correspond to the respective upward and downward axial movements of the sheaf disposing mechanism, and for this reason the same shaft which is effective to produce the said upward and downward axial movements of the sheaf disposing mechanism, g. the shaft 104, may be conveniently utilized to produce the opening and closing movements of the gates 117 and 118. The gear connections for this purpose are preferably of the following nature: The gate 117 is provided on its outer face with a horizontal row of gear teeth 120 which are engaged by a pinion 121 on a vertical shaft 122. A rock shaft 123 is mounted adjacent the gate 118 and is connected thereto by a toggle joint 124. The shaft 123 is driven from the shaft 122 by an intermediate shaft 125 (Figs. 1 and 6) and miter gear connections at the ends thereof between the shafts 122 and 123 respectively. The shaft 125 extends diagonally and is conveniently arranged under the base 1. The shaft 122 is operatively connected with the shaft 104 by a horizontal shaft 126, (Figs. 2 and 5), disposed longitudinally of the machine, and miter gearing between the ends of the shaft 126 and the respective shafts 104 and 122. It will thus be seen that when the shaft 104 is reversed, the shaft 122 and the parts operated thereby will be correspondingly reversed, whereby the opening and closing actions of the gates 117 and 118 correspond to the respective upward and downward movements of the sheaf disposing mechanism.

*Discharging the shock—The operation of the conveyer.*—As above stated, the finished shock is delivered from the machine by a conveyer which constitutes the base or bottom of the casing 23. This conveyer is preferably of endless character and comprises parallel endless chains 127, transverse slats 128 supported conjointly by the chains, and pivotally connected to the links thereof, the slats 128 forming a continuous platform, and shafts 129 and 130 which carry the sprockets over which the chains 127 run. The shaft 129 is located at the rear end of the machine, and the shaft 130 is located at the forward end of the machine. The bearings which carry the shaft 129 are preferably mounted for sliding adjustment in the base 1 by any suitable means, as shown more particularly in Fig. 1, in order to regulate the tension of the chains 127. The upper laps of the chains 127 run in suitable channel guides 127ª disposed longitudinally of the base 1 and provided to maintain the continuity of the uppermost slats 128. The power for operating the discharging conveyer is preferably taken from the traction wheel 5; but the operations of said conveyer are controlled, as will be presently explained, from the cam shaft 77. The driving connections of the discharging conveyer include a transverse stub shaft 131, (Fig. 5) which is connected by pinion gearing 132 to the conveyer shaft 129 and by chain and sprocket gearing 133 to the traction wheel 5. The sprocket 133ª of said gearing, which is mounted on the shaft 131, is loose relatively thereto and is automatically connected to and disconnected from said shaft 131 by the intermediary of a clutch 134 which may be of the same general construction as the clutch 36 above described and shown in detail in Figs. 10, 11 and 12 and which includes a spring pressed pawl lever having a projecting controlling arm 135.

The control of the operation of the conveyer is effected by a cam wheel 136 on the cam shaft 77 and an intermediately pivoted lever 137 which has one end formed for engagement by the cam wheel 136 and the other end formed to engage the arm 135 of the clutch 134. The cam lever 137 has connected thereto at a suitable point a spring 138 which causes said lever to follow the contour of the cam face of the wheel 136. At about the time that the core 25 in the upward movement of the sheaf disposing mechanism is withdrawn from the finished shock, the cam wheel 136 actuates the lever 137 against the tension of the spring 138, whereby the rear end of said lever disengages the arm 135 and the clutch 134 is thereby operative to connect the shaft 131 and the sprocket 133ª. At such time the movement of the conveyer is effected from the traction wheel 5, as is obvious. This movement is continued for such a period as may be required to effect the discharge of the finished shock, and thereafter the forward end of the lever 137 enters the depression of the cam formation of the wheel 136, and the rear end of said lever takes a position in the path of the arm 135, and ultimately engages said arm to effect the disconnection of the sprocket wheel 133ª from the shaft 131 and consequently, to interrupt the movement of the conveyer. Rearwardly of the conveyer a series of longitudinally disposed guide fingers 139 are arranged, these fingers being provided on a rotatably adjustable bar 140 and serving to guide the shock easily and steadily upon the ground. Obviously, by suitably adjusting the bar 140, the fingers 139 may be set at any position desired, according to choice or circumstances of use.

*Binding the shock—Forming the knot and cutting the cord.*—For the purposes of the present description, it may be noted that at one side of the extension 35 there is a cord holder 141 which is shown conventionally in the drawings, and is of any suitable construction, involving a spring-held cord bobbin or spool. The cord is led over the holder 141 through the eye of a needle 142. It must be assumed that during the preceding shock forming operation the cord thus led through the needle is also passed through the opening 143 in the adjacent wall of the extension 35, through which the needle works, around the finished shock, and thence through an opening 144 in the opposite wall of the extension 35 and through which the needle also works, the end of the cord beyond the opening 144 being secured in a device 145 which coacts with the needle 142, subsequently to the shock forming operation, to form a knot in the cord and to sever the cord, thereby completing the binding operation. The cord knotting and cutting device 145 may be of any suitable or known construction, and inasmuch as, *per se*, it forms no part of the invention, it is simply shown conventionally in the drawings. Assuming, then, that the cord X from the cord holder 141 has been wound around the finished shock in the manner stated, and that the shaft 63 has been set in operation to effect the upward movement of the sheaf disposing mechanism, during said upward movement the needle 142 is projected across the extension 35 to a position wherein it coacts with the knot forming and cord cutting device 145 to form a knot and cut the cord. Thereafter, and still during the upward movement of the sheaf disposing mechanism, the needle 142 is retracted.

The following connections for effecting the above stated operations of the needle are conveniently and preferably employed: The shaft 110 drives a transverse shaft 146, through the agency of a pinion 147 secured to the sprocket 111ª, a pinion 148 loosely mounted on the shaft 146, and a "slip joint" 149 between the pinion 148 and the shaft 146. The slip joint 149 may be of any suitable construction, such as a pawl and ratchet clutch connection which is operative to drive the shaft 146 when the pinion 148 rotates in one direction, and to allow said pinion 148 to run free of the shaft 146 when said pinion rotates in an opposite direction. Thus, when the shaft 110 is rotating in a direction to raise the sheaf disposing mechanism, the slip joint 149 couples the pinion 148 and the shaft 146, but when the shaft 110 is rotating in a direction to lower the sheaf disposing mechanism, the slip joint 149 allows the pinion 148 to run free of the shaft 146. The reason of the provision of the joint 149 is that the projection and retraction of the needle with reference to the extension 35 both take place during the upward movement of the sheaf disposing mechanism, and no operation of the needle takes place during the downward movement of the sheaf disposing mechanism. Consequently, the shaft 146 should be operative only during the upward movement of the sheaf disposing mechanism, and it is for this reason that, by virtue of the slip joint 149, provision is made for allowing the pinion 148 to run free of the shaft 146 during the downward movement of the sheaf disposing mechanism.

By reference to Fig. 24, it will be observed that the needle 142 is slidable in a suitable, channeled guide 150. The needle is directly connected near its extremity by a pin and slot joint 151 to the lower end of an operating lever 152. The lever 152 is pivoted near its upper end and above its pivot has a curvilinear arrangement of rack teeth which mesh with similar teeth provided at the lower end of a companion lever 153. The lever 153 is pivoted near its lower end. A link 154 (Fig. 17) forms an operative connection between the lever 153 and a wheel 155, the connection of said link to said wheel being eccentrically located. The wheel 155 may conveniently have a crown gear formation on its under face to engage with a miter gear at the adjacent end of a shaft 156, which is disposed longitudinally of the machine and which is driven from the shaft 146 by miter gear wheels 157, the gear wheel 157 on the shaft 146 being fast thereto and being located adjacent the loose pinion 148. Manifestly, when the shaft 146 is rotated by the pinion 148 through the intermediary of the slip joint 149, it produces a corresponding rotation of the wheel 155, the gearing being so selected as to effect one revolution of this wheel during the upward movement of the sheaf disposing mechanism; and in this single revolution the wheel 155 operates through the instrumentalities described, first to project the needle 142 across the casing and then to retract said needle from the casing and to its initial and normal position. The needle 142 is completely projected across the extension 35 and into coaction with the knot forming and cord cutting device 145 when the core 25 is still substantially within the shock, but after the retraction of the arms 26 into said core. In this way the core preserves the annular arrangement of the sheaves during the formation of the knot, and at the same time, the cord is wound about the sheaves as tightly as possible, since the retraction of the arms 26 allows of the sheaves being drawn by the cord closer to the center of the shock.

*Binding the shock—Arranging the cord prior to the shock forming operation.*—As previously stated, the binding of the shock proceeds continuously with the shock forming operation. The cord knotting and cutting operation which has just been described, presupposes a previous shock binding operation performed continuously with the shock forming operation. After the operation and retraction of the needle 142, mechanism becomes operative to arrange the cord with reference to the shock next to be formed, and whereby the binding of that shock may proceed continuously with the formation thereof. This cord arranging mechanism is timed to operate during the action of the shock discharging conveyer, and for this reason it is convenient and preferable to correlate this mechanism and the shock discharging conveyer in such manner as to produce an operation thereof from the rotation of the conveyer shafts. The details of construction and operation of the cord arranging mechanism are shown in Figs. 18 to 23. When the needle 142, after the cutting of the cord by the device 145, is retracted, it leaves one end of the cord secured in the said device 145 and, consequently, a length of the cord stretched between said device 145 and the end of the needle, across the extension 35, as indicated by the dotted lines Y in Fig. 18. The cord arranging mechanism is operative to engage the portion Y of the cord, and prior to the descent of the core 25 to form a bight in the cord through which the said core passes. Thereafter, and before the parts are set for the next shock forming operation, the cord arranging mechanism is reset.

The mechanism for accomplishing the object stated preferably comprises a pair of cables 158 and 159 provided with cord engaging fingers 160 which engage the cord portion Y aforesaid. The cables 158 and 159 have ends thereof secured to spring held rollers 161, adjacent the extension 35, and their other ends secured to sheaves 162 arranged on the respective shafts 129 and 130 of the shock discharging conveyer. The sheaves 162 are formed as parts of automatic clutches, similar in construction, which are effective to couple said sheaves and the shafts 129 and 130 when said shafts are in rotation, and to disconnect said sheaves from said shafts as soon as the rotation of said shafts is arrested, whereby the spring held rollers 161, to which the other ends of the cables 158 and 159 are connected, may operate to retract or reset said cables. Clutches of this character are well known and a form suitable for the purpose is shown by way of example in Fig. 23. Thus, the clutch comprises two companion members 163 and 164, the sheave 162 being formed as a part of the member 163, and the latter being loose on the shaft 129 or 130 as the case may be, while the member 164 is fast on said shaft. The member 163 has an internal arrangement of clutch teeth 165, and the member 164 carries a pawl 166 which is normally held out of engagement with said teeth by a relatively weak spring 167, and which is thrown into engagement with said teeth, by centrifugal force. Thus, when the rotation of the shafts 129 and 130 commences, the pawls 166 are engaged with the teeth 165, thus coupling the shafts and the sheaves 162, and when the rotation of said shafts is arrested, the springs 167 disengage the pawls 166 from the teeth 165 and thereby disconnect the sheaves 162 from said shafts, at which time the rollers 161 operate, as stated, to retract or reset the cables 158 and 159.

The cables 158 and 159 pass from the rollers 161 over suitable guide pulleys 168 and into and through the extension 35, being arranged adjacent the respective walls of said extension, as shown in Figs. 18 and 19, and at such an elevation that their fingers 160 will readily engage the cord portion Y aforesaid. The cable 158 passes from the extension 35 in a direction toward the rear of the machine, and thence over a guide pulley 169 suitably set into the marginal portion of the gate 118 of the casing 23, and from the guide pulley 169 over other suitable guide pulleys to the sheave 162 on the rear shaft 129 of the shock discharging conveyer. The cable 159 passes in a horizontal line across the casing 23 at a slightly forward inclination, and at the side of the casing opposite to the extension 35, passes over a guide pulley 170, and thence upwardly and over a guide pulley 171 arranged on the upper edge of the casing 23, from which latter guide pulley said cable is led over other suitable guide pulleys to the sheave 162 on the forward shaft 130 of the shock discharging conveyer. During the upward movement of the sheaf disposing mechanism, and previous to the operation of the shock discharging conveyer, the cables 158 and 159 have the relation shown in Fig. 21. Thereafter, and when the operation of the conveyer is in progress, the cables are paid out in the manner generally explained above. The paying out of the cables starts very shortly before the movement of the gates 117 and 118 to full open position, and continues during a portion of the closing movement of the gates, sufficiently to provide for a movement of the fingers 160 from the position shown in Fig. 21 to the position shown in Fig. 18, in which positions of said fingers a substantially triangular bight Z is formed in the cord X, through which bight the core 25 passes in the descent of the sheaf disposing mechanism. When the operation of the conveyer is arrested, the cables are reset by the rollers 161 in the manner explained, and the bight Z thereupon takes the form shown in Fig. 19, wherein it lies closely against the core 25. As the sheaves are fed into the casing 23, the cord will be progressively paid out against the tension of the spring held cord holder 141, as indicated in Fig. 20, and will ultimately completely encircle the sheaves, the completion of the circle formed by the cord being effected by the movement of the needle 142 across the extension 35, as indicated in Fig. 21. Thereupon the knot forming and cord cutting operation takes place, and the needle is retracted, leaving the portion Y to be engaged by the fingers 160 when the cables 158 and 159 are paid out, all as above explained. At this point it may be noted that when the cable 159 is reset, the length of said cable between the roller 161 and the sheave 162 on the shaft 130 is such that there will be sufficient slack to enable the cable 159 to be pressed by the sheaves as they are progressively fed into the casing 23 from its straight position across said casing, as shown in Fig. 19, to a curvilinear position against the side of said casing, as shown in Fig. 21, this slack being taken up, so that the cable is always under tension, by a rewinding or anti-back lash spring 172, which is associated with the sheave 162 on the shaft 130, and which, of course, has considerable less power than the spring of the roller 161, to which the opposite end of the cable 159 is connected. At the start of the effective operation of the shock discharging conveyer, the spring 172 causes the sheave 162 on the shaft 130 to first bring the cable 159 from the position of Fig. 21 to the position of Fig. 19, and thereafter said cable is paid out from its roller 161 by the rotation of the shaft 130. By virtue of this preliminary action of the spring 172, the cable 159 is initially operative to start the shock from the casing 23 and to cause the ready movement of the shock with the shock discharging conveyer.

*Résumé of the operations of the machine.*—The machine is drawn over the field with the binder, being suitably connected to the latter by any desired means, (not shown) and being propelled either by draft animals hitched to the front bar of the base 1, or by suitable power machines. As the machine moves with the binder, sheaves are fed singly and successively into the casing 23 of the shock forming mechanism and therein are disposed as a shock by the sheaf disposing mechanism 24, each sheaf actuating mechanism, already described, for producing a rotation through a tenth of a revolution of the sheaf disposing mechanism. That sheaf of the shock which was first fed into the casing 23 actuates the devices described for causing the rotation of the shaft 63. In the rotation of the shaft 63, the sheaf disposing mechanism is first elevated to clear the shock, and at the same time, the arms 26 are retracted, and the gates 117 and 118 of the casing 23 are opened. During the formation of the shock, the cord X is being continuously wound around the same, as above explained, and during the upward movement of the sheaf disposing mechanism, the needle 142 coacts with the device 145 to form the knot and sever the cord, and thus complete the binding operation, after which the needle is retracted, all as above explained. Shortly before the sheaf disposing mechanism is withdrawn from the shock, mechanism controlled by the cam shaft 77 is operated to provide for the action of the shock discharging conveyer, all as above explained, the said conveyer being driven from the traction wheel 5. Thereafter, the gates 117 and 118 come to full open position and the shock is carried by the conveyer from the casing 23 and discharged at the rear end of the machine, the action of the conveyer in this regard being facilitated by the cable 159, all as above explained. Thereafter, the connections on the cam shaft 77 operate to cause the descent of the sheaf disposing mechanism and the closing movement of the gates 117 and 118. The shock discharging conveyer continues to move during a first portion of the downward movement of the sheaf disposing mechanism and of the closing movements of the gates 117 and 118, the movement of the conveyer being thus continued, in order to completely effect the operations of the cables 158 and 159, which form the bight Z in the cord X, in the manner above explained. The action of the sheaf discharging conveyer is interrupted after the core 25 of the sheaf disposing mechanism passes through the bight Z and when the action of the said conveyer is thus interrupted, the cables 158 and 159 are reset, and the bight Z catches against the core 25. When the sheaf disposing mechanism completes its downward movement, the sheaf disposing arms 26 are projected and the rotation of the shaft 63 is arrested, all as above explained.

It will be understood that no specific description herein contained is intended to put any limitation upon the scope of the appended claims which does not inhere in the language thereof.

Having fully described my invention, I claim:

1. In a machine for forming sheaves into shocks, shock forming mechanism including an upright annular sheaf receiving casing and sheaf disposing mechanism intermittently movable therein, sheaf operated connections for automatically and periodically controlling the movements of said sheaf disposing mechanism, a shock discharging means comprising an endless conveyer which forms the bottom of the casing, the latter having displaceable walls which are in closed relation during the shock forming operation, means for operating the shock forming mechanism to enable the discharge of the finished shock by said shock discharging means and including mechanism for opening said displaceable walls, and means operable during the opening of said walls for effecting the operation of said shock discharging means.

2. In a machine for forming sheaves into shocks, shock forming mechanism including an upright annular sheaf receiving casing and a sheaf disposing mechanism intermittently movable therein, sheaf operated connections for automatically and periodically controlling the movements of said sheaf disposing mechanism, a shock discharging means comprising an endless conveyer which forms the bottom of the casing, the latter having displaceable walls which are in closed relation during the shock forming operation, means for operating the shock forming mechanism to enable the discharge of the finished shock by said shock discharging means and including mechanism for opening said displaceable walls, means operable during the opening of said walls for effecting the operation of said shock discharging means, the casing having a vertical extension through which the sheaves are fed singly and successively to the sheaf disposing mechanism, a binding cord holder located at one side of the extension, a knotting and cord cutting device located at the opposite side of the extension, a needle movable across the extension when the shock is completed to co-act with said device in completing the binding operation, means operable prior to each shock forming operation to arrange the binding cord for the shock next to be formed and in operative relation to said casing and sheaf disposing mechanism, and means operable after each shock forming mechanism to move the needle across the extension into co-action with said device.

3. In a machine for forming sheaves into shocks, shock forming mechanism comprising a casing and sheaf disposing mechanism rotatable on a vertical axis therein and movable longitudinally of its axis, the sheaf disposing mechanism comprising a core, sheaf disposing arms adapted to project radially from the core, and devices within the core for retracting said arms when the core moves axially out of the casing and for projecting said arms when the core moves axially into the casing.

4. In a machine for forming sheaves into shocks, shock forming mechanism comprising a casing and sheaf disposing mechanism rotatable on a vertical axis therein and movable longitudinally of its axis, the sheaf disposing mechanism comprising a core, sheaf disposing arms adapted to project radially from the core, devices within the core for retracting said arms when the core moves axially out of the casing and for projecting said arms when the core moves axially into the casing, and elements at the sides of the core movable relatively thereto to operate said arm projecting and arm retracting devices and operable also to effect the axial movements of the core.

5. In a machine for forming sheaves into shocks, shock forming mechanism comprising a casing, sheaf disposing mechanism rotatable on a vertical axis therein and movable longitudinally of its axis, the sheaf disposing mechanism comprising a core, sheaf disposing arms increasing progressively in length toward the lower end of the core and adapted to project radially therefrom, devices within the core for retracting said arms when the core moves out of the casing and for projecting said arms when the core moves axially into the casing, and elements at the sides of the core for progressively actuating said arm projecting and retracting devices and being operable also to effect the axial movements of the core.

6. In a machine for forming sheaves into shocks, shock forming mechanism comprising a casing and sheaf disposing mechanism rotatable on a vertical axis therein and movable longitudinally of said vertical axis, the casing having movable gates on the side thereof through which the finished shock is discharged, means for effecting intermittent partial rotation of the sheaf disposing mechanism during the shock forming operation, means for moving the sheaf disposing mechanism longitudinally of its vertical axis into and out of the casing after each shock forming operation, and means for opening and closing the gates of the casing during the respective upward and downward movements of the sheaf disposing mechanism.

7. In a machine for forming sheaves into shocks, shock forming mechanism comprising a casing and sheaf disposing mechanism rotatable on a vertical axis therein and movable longitudinally of said vertical axis, means for effecting intermittent partial rotations of the sheaf disposing mechanism during the shock forming operation, the casing having gates on the side thereof through which the finished shock is discharged, a gear train carried by and rotatable with the sheaf disposing mechanism and operable to move the latter longitudinally of its vertical axis into and out of the casing, automatic, reversing gearing for operating said train and for opening and closing the gates during the respective upward and downward movements of the sheaf disposing mechanism, means for automatically connecting and disconnecting said gear train and the automatic reversing gearing at the inception and the completion of the action of the latter, and means for rendering inoperative the sheaf disposing mechanism rotating means during the action of said reversing gearing and for rendering said means operative at the completion of the action of said reversing gearing.

8. In a machine for forming sheaves into shocks, shock forming mechanism comprising a casing and sheaf disposing mechanism arranged therein, the casing having an extension at one side thereof, sheaf packers acting throughout the length of the extension, and sheaf controlled gearing for periodically and automatically operating said packers and including a movable controlling element normally projecting across said extension in the path of the sheaves passing through the same.

9. In a machine for forming sheaves into shocks, shock forming mechanism comprising a casing and sheaf disposing mechanism rotatable therein, the casing having an extension at one side thereof through which the sheaves are fed, sheaf packers working throughout the length of said extension, gearing for effecting intermittent and partial rotations of the sheaf disposing mechanism, gearing for effecting intermittent operations of the sheaf packers, and a sheaf operated element normally located in the extension in the path of the sheaves passing through the same for automatically controlling the operations of said gearings.

10. In a machine for forming sheaves into shocks, shock forming mechanism comprising a casing and sheaf disposing mechanism rotatable therein, the casing having a sheaf receiving extension at one side thereof, gearing for effecting intermittent partial rotations of the sheaf disposing mechanism, and including a power wheel, a shaft driven thereby, and a clutch to connect and disconnect said shaft and said power wheel, and a sheaf actuated device normally located in the extension in the path of the sheaves passing through the same for controlling the operation of said clutch.

11. In a machine for forming sheaves into shocks, a casing and sheaf disposing mechanism therein, the casing having a sheaf receiving extension at one side thereof, devices for feeding a sheaf into the casing, a shaft to operate said devices, a power wheel, a clutch to connect and disconnect said shaft and said power wheel, and a sheaf actuated element normally located in the extension in the path of the sheaves passing through the same for controlling the operations of said clutch.

12. In a machine for forming sheaves into shocks, shock forming mechanism operable to arrange the sheaves into a shock, gearing for operating said mechanism in accordance with the delivery of each sheaf thereto, a shaft operable when the last sheaf of the shock has been delivered to said mechanism, an element operated by the sheaf of the completed shock when the last sheaf has been delivered thereto for controlling the operations of said shaft, and means operated by said shaft for causing the shock forming mechanism to release the finished shock.

13. In a machine for forming sheaves into shocks, shock forming mechanism comprising a casing and sheaf disposing mechanism rotatable on a vertical axis therein, sheaf controlled gearing for intermittently and partially rotating the sheaf disposing mechanism, a periodically rotatable shaft and driving means therefor, means operable at the completion of the operation of the sheaf disposing mechanism to provide for the operation of said shaft, a sheaf discharging conveyer, means operable by said shaft to cause the shock forming mechanism to release the finished shock, and means having its operation controlled from said shaft for operating the sheaf discharging conveyer when the finished shock is released by the shock forming mechanism.

14. In a machine for forming sheaves into shocks, shock forming mechanism comprising a casing and sheaf disposing mechanism inclosed therein and movable longitudinally of its vertical axis after the formation of a shock, means operable to engage a cord about the shock concomitantly with the formation thereof, means operable after the formation of a shock to produce longitudinal movements of the sheaf disposing mechanism, and means operable during the longitudinal movements of the sheaf disposing mechanism to tie and cut the binding cord and to thereby complete the binding operation.

15. In a machine for forming sheaves into shocks, shock forming mechanism including a casing and sheaf disposing mechanism inclosed therein and movable longitudinally of its vertical axis, after the completion of the shock forming operation, means operable to engage a cord about the shock concomitantly with the formation thereof, means operable after the shock forming operation for longitudinally moving the sheaf disposing mechanism, means operable during the longitudinal movement of the sheaf disposing mechanism for tying and cutting the cord, and means operable after the operation of the cord tying and cutting means and also during the longitudinal movement of the sheaf disposing mechanism for arranging the cord preliminary to the next shock forming operation and in operative relation to said casing and said sheaf disposing mechanism.

16. In a machine for forming sheaves into shocks, shock forming mechanism comprising a casing and sheaf disposing mechanism inclosed therein and movable longitudinally of its vertical axis after the shock forming operation, means for periodically and partially rotating the sheave disposing mechanism about said vertical axis during the operation of the shock forming mechanism, a cord tying and cutting device in which one end of the cord is secured, a spring operated cord holder from which the cord is led, and a needle having an eye through which the cord passes, the cord being engaged about the shock concomitantly with the formation thereof, means operable after the formation of the shock to move the needle into coaction with the cord tying and cutting device, means operable after the formation of the shock for longitudinally moving the sheaf disposing mechanism, cables operable during the longitudinal movement upward of the sheaf disposing mechanism for forming a bight in the cord in preparation for the shock next to be formed, and means to automatically reset said cables when the sheaf disposing mechanism comes into its normal position within the casing.

17. In a machine for forming sheaves into shocks, shock forming mechanism including a casing having a sheaf receiving extension and sheaf disposing mechanism in said casing, means including a cord holder and a knot forming and cord cutting device located at opposite sides of said extension for engaging a cord about the shock concomitantly with the formation thereof, means operable after the shock forming operation to move the sheaf disposing mechanism from and into the casing, a needle through which the cord passes and which is movable across the extension to coact with said device, means operable after the shock forming operation to effect the movements of the needle, and means operable during the movement of the sheaf disposing mechanism from and into the casing to form a bight of the cord within the casing and through which the sheaf disposing mechanism may pass during its return movement into the casing.

18. In a machine for forming sheaves into shocks, shock forming mechanism comprising a casing having movable gates and a sheaf disposing mechanism rotatable upon a vertical axis in the casing and also movable on a longitudinal axis, gearing having its operation controlled by each sheaf passed into the casing for intermittently and partially rotating the sheaf disposing mechanism, means for longitudinally moving the sheaf disposing mechanism, means for opening and closing the gates of the casing, means for discharging the finished shock and other gearing controlled by the first sheaf of the shock at the completion of the shock forming operation for causing the action of the means for longitudinally moving the sheaf disposing mechanism, of the gate opening and closing means, and of the shock discharging means.

19. In a machine for forming sheaves into shocks, shock forming mechanism comprising a casing having movable gates and a sheaf disposing mechanism rotatable on a vertical axis in the casing and also movable longitudinally on said axis, gearing having its operation controlled by each sheaf passed into the casing for intermittently and partially rotating the sheaf disposing mechanism, means for longitudinally moving the sheaf disposing mechanism, means for opening and closing the gates of the casing, a cord having a bight thereof passed about the shock, and a cord holder and a knot forming and cutting device to which the ends of the cord are secured, a needle in coaction with said device, means for forming a bight in the cord prior to each shock forming operation, means for discharging the finished shock, and gearing controlled by the first sheaf of the shock at the completion of the shock forming operation for causing in properly timed sequence the action of the means for longitudinally moving the sheaf disposing mechanism, of the gate opening and closing means, of the needle, of the shock discharging means, and of the bight forming means.

20. In a machine for forming sheaves into shocks, shock forming mechanism comprising a casing and sheaf disposing mechanism rotatable on a vertical axis in the casing and longitudinally movable on said axis, gearing for producing intermittent partial rotations of the sheaf disposing mechanism as each sheaf is fed into the machine, gearing operable after the shock forming operation to raise and lower the sheaf disposing mechanism, the casing having gates, gearing operable to open and close the gates in correspondence to the upward and downward movements of the sheaf disposing mechanism, a cord having a bight thereof passed about the shock and a cord holder and a knot forming and cutting device to which the ends of the cord are secured, a needle in coaction with said device, means for operating and retracting the needle during the upward movement of the sheaf disposing mechanism, a shock discharging means, means for forming a bight in the cord prior to each shock forming operation, devices to correlate the bight forming means to the shock discharging means, and means for timing the action of the shock discharging and bight forming means with suitable reference to the longitudinal movements of the sheaf disposing mechanism.

21. In a machine for forming sheaves into shocks, shock forming mechanism including a casing and sheaf disposing mechanism therein, the casing having movable gates, a gear train for raising and lowering the sheaf disposing mechanism, a gear train for opening and closing the gates, a reversible shaft driving both gear trains, a drive shaft, a driving wheel, a clutch to connect and disconnect said drive shaft and driving wheel, a slide controlling the clutch, connections for driving said reversible shaft in either direction from said drive shaft, a cam shaft operated by said drive shaft and having cams thereon to control the reverse of said reversible shaft and the position of said slide.

22. In a machine for forming sheaves into shocks, shock forming mechanism including a casing and sheaf disposing mechanism therein, the casing having movable gates, a gear train for raising and lowering the sheaf disposing mechanism, a gear train for opening and closing the gates, a reversible shaft driving both gear trains, a shock discharging conveyer, a clutch operable to cause and to arrest the action of said conveyer, a drive shaft and a driving wheel therefor, a clutch to connect and disconnect said drive shaft and wheel, gearing connecting said drive shaft and said reversible shaft and to rotate the latter in either direction from the former, a cam shaft operable by the drive shaft, and cam means operated by said cam shaft to control the action of both of said clutches aforesaid and the reverse of said reversible shaft.

23. In a machine for forming sheaves into shocks, shock forming mechanism including a casing and sheaf disposing mechanism therein, the casing having movable gates, a gear train for raising and lowering the sheaf disposing mechanism, a gear train for opening and closing the gates, a reversible shaft driving both gear trains, a shock discharging conveyer, a clutch operable to cause and to arrest the action of said conveyer, a drive shaft and a driving wheel therefor, a clutch to connect and disconnect said drive shaft and wheel, gearing connecting said drive shaft and said reversible shaft and to rotate the latter in either direction from the former, a clutch to connect and disconnect the gear train for raising and lowering the sheaf disposing mechanism and the reversible shaft, a cam shaft operable by the drive shaft, and cam means operated by said cam shaft to control the action of all of said clutches aforesaid and the reverse of said reversible shaft.

24. In a machine for forming sheaves into shocks, shock forming mechanism including a shock forming casing and a sheaf disposing mechanism rotatable therein, gearing controlled by each sheaf for intermittently and partially rotating the shock forming mechanism, sundry instrumentalities operable subsequent to the shock forming mechanism toward the end of discharging the finished shock, a main drive shaft controlling the operation of said instrumentalities, a driving wheel for said shaft, a clutch to connect and disconnect said wheel and said shaft, spring held sheaf operated means operable at the completion of the shock forming operation to cause said clutch to connect said wheel and said shaft, and cam operated means for maintaining the connection of said wheel and shaft during a certain number of revolutions of the latter.

25. In a machine for forming sheaves into shocks, shock forming mechanism comprising a casing and a sheaf disposing mechanism rotatable on a vertical axis therein, the casing having an extension through which the sheaves are fed, sheaf packers working in the extension, gearing for effecting intermittent partial rotation of the sheaf disposing mechanism, and gearing for operating said packers during each partial rotation of said mechanism.

26. In a machine for forming sheaves into shocks, shock forming mechanism including a casing and sheaf disposing mechanism therein movable on a vertical axis longitudinally thereof after the completion of a shock forming operation, a shock discharging conveyer operable during a portion of the upward and downward movements of said sheaf disposing mechanism, a cord holder, a knot forming and cord cutting device, a needle movable into and out of coaction with said device and which, when moving away from said device, leaves a length of the cord stretched across the entrance of the casing, and means for forming a bight in the cord comprising a pair of cables, spring held rollers to which ends of the cables are connected, sheaves on the shafts of the shock discharging conveyer to which the other ends of the cables are connected, guide pulleys for the cables, fingers carried by the cables to engage the length of the cord stretched across the entrance of the casing and to thereby form a bight in the cord within the casing, consequent to the movements of the cables, and clutches operable automatically to connect said sheaves and said shafts when the latter are in rotation and to disconnect said sheaves from said shaft when the rotation of the latter is arrested.

27. In a machine for forming sheaves into shocks, shock forming mechanism including a casing having a sheaf receiving extension and sheaf disposing mechanism arranged in said casing, gearing for effecting rotation of the sheaf disposing mechanism, an element normally located in the extension to control and provide for intermittent operations of said gearing and operable by each sheaf as it passes into the casing, other gearing for raising and lowering the sheaf disposing mechanism, and an element located adjacent the extension to control the operation of said last named gearing and operable automatically by the sheaf of the shock which was first fed into the casing when the last sheaf of the shock has been fed into the casing.

28. In a machine for forming sheaves into shocks, shock forming mechanism to which sheaves are delivered singly and in an upright position, and a sheaf transferring mechanism to pass the sheaves from the binder to the shock forming mechanism and comprising a tortuous casing having a horizontal sheaf receiving end and a vertical sheaf discharging end, chains arranged in pairs at opposite sides of the casing and having sheaf engaging fingers, the chains at one side of the casing working horizontally and the chains at the other side of the casing working vertically, the upper horizontal chain and the outer vertical chain moving at a substantially greater rate of speed than the chains companion thereto.

29. In a machine for forming sheaves into shocks, shock forming mechanism comprising a casing and sheaf disposing mechanism rotatable on a vertical axis therein and movable longitudinally on said axis, an endless conveyer which forms the bottom of said casing, the casing having normally closed movable walls operative to open for the discharge of the shock, and having also a sheaf receiving extension, gearing operable concomitantly with the delivery of sheaves into the casing for effecting intermittent partial rotations of the sheaf disposing mechanism, gearing for raising and lowering the sheaf disposing mechanism and operable upon the completion of the shock, gearing for opening and closing the walls of the casing during periods of the longitudinal movements of the sheaf disposing mechanism, and gearing for operating the conveyer during periods of the movements of said walls.

30. In a machine for forming sheaves into shocks, shock forming mechanism comprising a casing and sheaf disposing mechanism rotatable on a vertical axis therein and movable longitudinally on said axis, an endless conveyer which forms the bottom of said casing, the casing having normally closed movable walls operative to open for the discharge of the shock, and having also a sheaf receiving extension, gearing operable concomitantly with the delivery of sheaves into the casing for effecting intermittent partial rotations of the sheaf disposing mechanism, gearing for raising and lowering the sheaf disposing mechanism and operable upon the completion of the shock, gearing for opening and closing the walls of the casing during periods of the longitudinal movements of the sheaf disposing mechanism, gearing for operating the conveyer during periods of the movements of said walls, and connections for automatically correlating the several gearings aforesaid to operate in definitely timed sequence.

31. In a machine for forming sheaves into shocks, shock forming mechanism including a casing and sheaf disposing mechanism rotatable on a vertical axis therein and longitudinally movable on said axis, the sheaf disposing mechanism comprising a core provided with retractile arms arranged in projected relation when said core is in the casing, gearing for rotating the sheaf disposing mechanism comprising a worm wheel keyed upon the core near the upper end thereof and supported in a fixed plane and a worm operating said worm wheel, the core having longitudinal slots, gearing for raising and lowering the sheaf disposing mechanism comprising rack bars mounted in said slots and having periods of movement relative to the core and periods of movement with the core, and pinions engaging said rack bars, and connections between the rack bars and the arms to cause the retraction and projection of the latter during the periods of relative movement of said rack bars.

32. In a machine for forming sheaves into shocks, shock forming mechanism including a casing and sheaf disposing mechanism rotatable on a vertical axis therein, the sheaf disposing mechanism comprising a core having radially projecting sheaf disposing arms, gearing for rotating said core, a driving element for said gearing, a clutch for connecting and disconnecting said driving elements, a ring rotatable with the core and having peripheral notches corresponding in number to the sheaves for which the shock forming mechanism has capacity, a lever having an arm which engages the periphery of said ring and a second arm which controls said clutch, the lever having its movements controlled by the notches in said ring, and means actuated by the passage of a sheaf into the casing for operating said lever to cause the clutch to connect said gearing and said driving element.

33. In a machine for forming sheaves into shocks, shock forming mechanism comprising a casing and sheaf disposing mechanism rotatable therein, the casing having a sheaf receiving extension at one side thereof, gearing for effecting intermittent partial rotations of the sheaf disposing mechanism and including a power wheel, a shaft driven thereby, and a clutch to connect and disconnect said shaft and said power wheel, a sheaf actuated device normally located in the extension in the path of the sheaves passing through the same for controlling the operation of said clutch, sheaf packers acting throughout the length of the extension, and gearing interposed between said shaft and said packers for operating the latter from the former.

In testimony whereof I have hereunto set my hand in presence of two subscribing witnesses.

PETER KETELSEN.

Witnesses:
CHAS. S. HYER,
JOHN S. POWERS.